(12) United States Patent
Morrison et al.

(10) Patent No.: US 12,063,195 B2
(45) Date of Patent: *Aug. 13, 2024

(54) PLATFORM-INITIATED SOCIAL MEDIA POSTING WITH TIME LIMITED RESPONSE

(71) Applicant: Phanto, LLC, Scottsdale, AZ (US)

(72) Inventors: Daniel Morrison, Scottsdale, AZ (US); Charles Godewyn, Phoenix, AZ (US); David Holland, Phoenix, AZ (US)

(73) Assignee: PHANTO, LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/317,911

(22) Filed: May 15, 2023

(65) Prior Publication Data

US 2023/0300101 A1    Sep. 21, 2023

Related U.S. Application Data

(63) Continuation-in-part of application No. 17/823,958, filed on Sep. 1, 2022, now Pat. No. 11,652,778, which is a continuation of application No. 17/688,901, filed on Mar. 8, 2022, now Pat. No. 11,616,751, which is a continuation of application No. 16/846,244, filed on
(Continued)

(51) Int. Cl.
*H04L 51/52* (2022.01)
*H04L 51/046* (2022.01)
*H04L 51/212* (2022.01)

(52) U.S. Cl.
CPC .......... *H04L 51/52* (2022.05); *H04L 51/046* (2013.01); *H04L 51/212* (2022.05)

(58) Field of Classification Search
None
See application file for complete search history.

(56) References Cited

U.S. PATENT DOCUMENTS 9,461,958 B1    10/2016 Green
10,609,109 B1 *  3/2020 Asman ................... H04L 65/80
(Continued)

FOREIGN PATENT DOCUMENTS

CN    108600554 A    9/2019
CN    108600554 B    6/2020

OTHER PUBLICATIONS

Karissa Bell; Facebook's Slingshot: A Prettier, More Desperate Version of Snapchat; Mashable; https://mashable.com/archive/slingshot-hands-on; Jun. 17, 2014; p. 7.
(Continued)

*Primary Examiner* — Natisha D Cox
(74) *Attorney, Agent, or Firm* — Brad Bertoglio; Intelink Law Group, P.C.

(57) ABSTRACT

Systems and methods for a social networking platform or users thereof to solicit candid content from users. One or more users are selected for receipt of a post request. The users may be selected for a given post request based upon rules-based criteria and algorithmic optimization. Request recipients may provide qualified content posts in response to receipt of a post request. Content posts may be qualified based upon systematically-imposed editorial constraints including a time period during which a qualified post may be made, or other restrictions on the post authoring process.

30 Claims, 16 Drawing Sheets

Related U.S. Application Data

Apr. 10, 2020, now Pat. No. 11,539,654, which is a continuation of application No. 16/595,446, filed on Oct. 7, 2019, now Pat. No. 10,652,198.

(60) Provisional application No. 63/492,556, filed on Mar. 28, 2023, provisional application No. 62/887,271, filed on Aug. 15, 2019, provisional application No. 62/874,510, filed on Jul. 16, 2019.

(56) References Cited

U.S. PATENT DOCUMENTS

| | | |
|---|---|---|
| 2010/0145762 A1 | 6/2010 | Coladonato |
| 2010/0228642 A1 | 9/2010 | Baker et al. |
| 2012/0201418 A1 | 8/2012 | Bellwood |
| 2012/0260353 A1 | 10/2012 | Raley |
| 2013/0311219 A1 | 11/2013 | Green |
| 2013/0312077 A1 | 11/2013 | Basson |
| 2014/0082067 A1 | 3/2014 | Byers |
| 2015/0193889 A1 | 7/2015 | Garg |
| 2015/0227579 A1 | 8/2015 | Cantarero |
| 2015/0347432 A1 | 12/2015 | Tsai |
| 2015/0381371 A1 | 12/2015 | Liu |
| 2016/0014176 A1* | 1/2016 | Ariav ............ H04L 67/52 709/219 |
| 2016/0125451 A1 | 5/2016 | Garg |
| 2016/0164846 A1 | 6/2016 | Casler |
| 2016/0357355 A1 | 12/2016 | Carrigan |
| 2017/0366498 A1* | 12/2017 | Green ............ G06V 40/172 |
| 2018/0006992 A1 | 1/2018 | Siswadi |
| 2018/0192087 A1 | 7/2018 | Dudko |
| 2018/0246983 A1 | 8/2018 | Rathod |
| 2020/0219140 A1* | 7/2020 | Frankel ............ G06Q 50/01 |
| 2021/0150541 A1* | 5/2021 | Gurbuxani .......... G06N 20/10 |

OTHER PUBLICATIONS

Josh Constine; Facebook's Slingshot Challenges Snapchat With 'Reply to Unlock'; TechCrunch; https://techcrunch.com/2014/06/17/facebook-slingshot/; Jun. 17, 2014; p. 5.

Stinson, Liz, "Minutiae: The Curious App That Captures Your Unfiltered Life", WIRED Magazine, May 26, 2017 (downloaded on Jul. 15, 2022 from https://www.wired.com/2017/05/minutiae-curious-app-captures-unfiltered-life/).

* cited by examiner

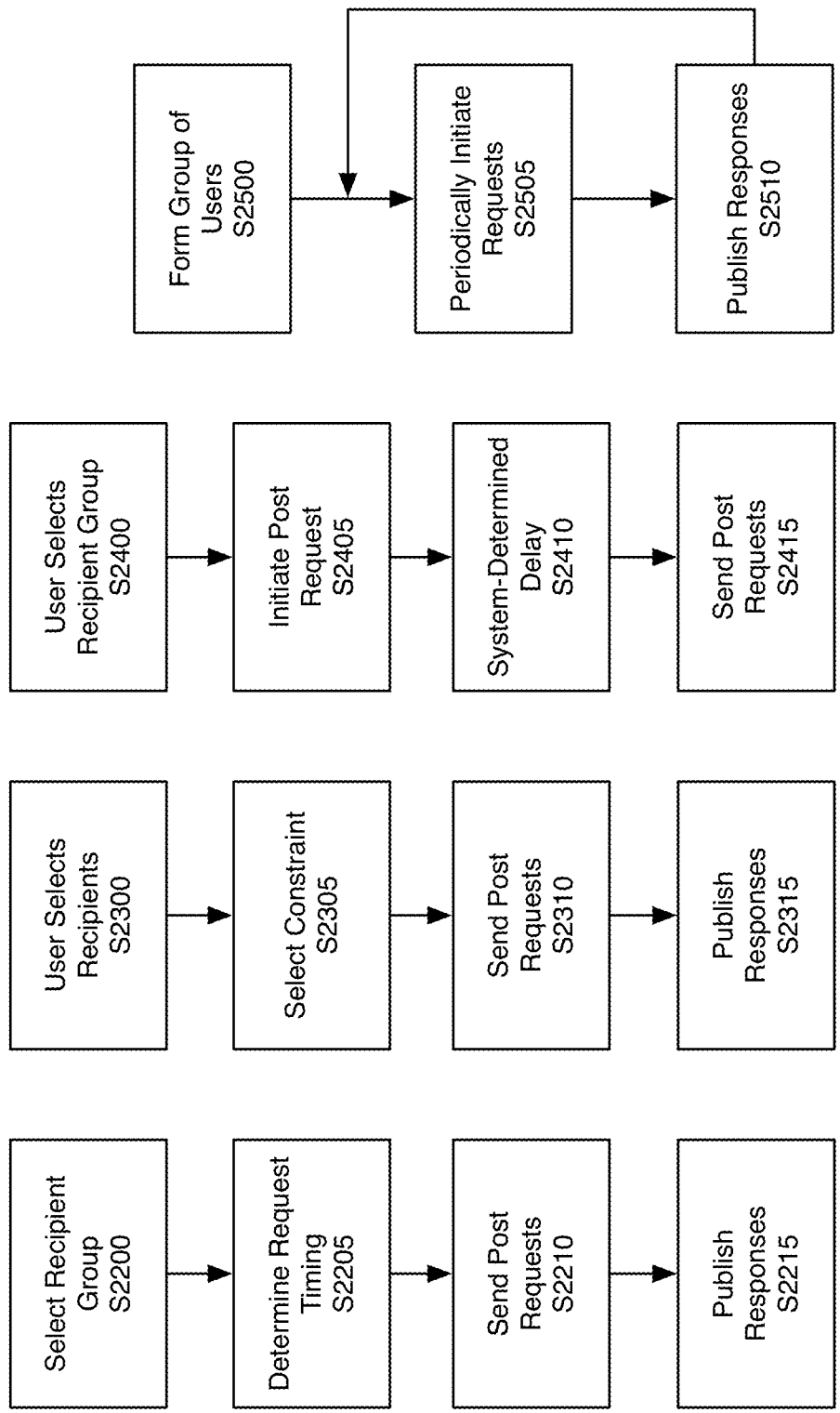

PLATFORM-INITIATED SOCIAL MEDIA POSTING WITH TIME LIMITED RESPONSE

RELATED APPLICATIONS AND CLAIM OF PRIORITY

This patent application claims the benefit of U.S. provisional patent application 63/492,556, filed Mar. 28, 2023; and this patent application is a continuation-in-part of U.S. patent application Ser. No. 17/823,958 filed Sep. 1, 2022 entitled PLATFORM-INITIATED SOCIAL MEDIA POSTING WITH TIME LIMITED RESPONSE; which is a continuation of U.S. patent application Ser. No. 17/688,901 filed Mar. 8, 2022 entitled THIRD PARTY-INITIATED SOCIAL MEDIA POSTING, which is a continuation of U.S. patent application Ser. No. 16/846,244 filed Apr. 10, 2020 entitled THIRD PARTY-INITIATED SOCIAL MEDIA POSTING, which is a continuation of U.S. patent application Ser. No. 16/595,446 filed on Oct. 7, 2019 now issued as U.S. Pat. No. 10,652,198, which claims priority to, and incorporates by reference, U.S. provisional patent application No. 62/887,271 filed on Aug. 15, 2019 and U.S. provisional patent application No. 62/874,510 filed on Jul. 16, 2019, both titled THIRD PARTY-INITIATED SOCIAL MEDIA POSTING.

TECHNICAL FIELD

Embodiments of the present disclosure relate in general to content posts on social media and other electronic communication services, and in particular to computer-implemented systems and methods to interactively share image-based content.

BACKGROUND

In recent years, social media services and other online communication services have become increasingly important avenues for human expression and communication. For many individuals, online platforms have become a primary method by which they communicate. Such services include, without limitation, Facebook®, YouTube®, Instagram®, Snapchat®, WhatsApp®, Twitter®, Telegram®, Discord®, and online forums and chatrooms.

Sharing personal moments with friends, family, and the public through electronic means, in various formats including image, video and text, has brought people closer together by providing a glimpse into the life experiences of one another. This value is increased proportionately as individual posts are shared to more than just one friend at a time. When sharing such personal moments, users tend to edit them, both consciously and subconsciously, to try to make those moments look good. One of the most powerful ways users edit shared moments is through self-selection of which of their moments to share. For example, individuals tend to capture and/or share moments they think would be interesting to others, or that make their lives look interesting, such as vacation moments, special events, or moments they are doing something noteworthy or in which they think they look good or interesting.

More recently, as the world of simplified photo filters exploded that make us and our photos look better or more interesting than real life, combined with mass sharing and the seeking of likes and other feedback from followers, personal posts became synonymous with highlights and increasingly, with inauthenticity. In extreme but all too common situations, users engage in a race to see whose lives look better. This pervasive inauthenticity has started a counter trend to post content of a more authentic nature, particularly among digital natives whose digital and real lives are intertwined.

To some, this trend might be thought of as a way to cleanse one's psyche by showing a real side of one's life, or as a way to reinforce the idea that friends like us for who we truly are in our unfiltered, non-edited moments, in direct contrast to what we might share on common social platforms in the race for social validation. One example of this counter trend toward authenticity was the emergence of ephemeral photos and videos such as those made popular by Snapchat and later incorporated by Instagram, Facebook, and others, which tend to foster more authentic, less edited posts. Another trend was the emergence of fake accounts on Instagram (often referred to as Finsta accounts), considered far more private than traditional accounts and therefore safer for posting your real, unedited and often unflattering but still personally meaningful moments.

But while these ephemeral and more private methods of sharing foster greater authenticity than their early social media predecessors, they still maintain perhaps the most powerful editorial filter of all, the user's ability to fully control which of their personal moments to share. We start doing this simply by choosing which moments to take out our devices and capture, and if we don't share these instantly, we subsequently do this again by choosing which of our previously captured moments (e.g. from our camera roll) to post on social media (whether one-to-many or one-to-one posts). Without consciously recognizing it, this means many more authentic, less planned moments of our lives go uncaptured and unshared. The candid, non-posed, unplanned moments that would often serve as the most accurate reflection and reminder of what our lives were really like slip by undocumented. All the while, sharing the more authentic moments from our lives would allow us to grow even closer with our true friends by knowing what one another are really experiencing, and reflecting on our own authentic moments later in life would provide a richer, more meaningful memory of our actual journey.

SUMMARY

One approach to sharing content of greater authenticity is via methods and systems that shift key decision-making concerning selection of which moments to capture and share, by delegating those decisions to someone or something other than the primary post author. In some embodiments, decisions concerning timing of when an image or video will be captured for sharing may be made by one or more individuals not even physically present with the post author or the capturing device at the time of capture. A requestor may initiate a post request to a target poster's device, and the target poster may be provided with a limited period of time in which to capture and share such a post using the receiving device (e.g. smartphone). Additionally or alternatively, a target poster may be precluded from accessing certain system or application functionality until a qualified content posting is submitted (or such functionality is restored after a predetermined period of time).

In some embodiments, the selection of post request recipients, timing of when an image or video will be captured, or other details concerning the imposition of editorial constraints on a requested post, may be controlled by the system itself rather than another user. An automated random request-for-post generator may be implemented to send users requests at random times. Artificial intelligence or other logic may be utilized to optimize ideal times to request posts or post request recipient groups. Recipient groups may be optimized based upon factors including the frequency with which users communicate with one another, the recency of communications between users with a prospective group, information within a user's platform profile, historical responsiveness of users to third party-initiated post requests, the time since a user's last third-party initiated post request, certain users having previously matched for communication, or the like. Such optimization of the post process may, e.g., be tailored to maximize user engagement, enjoyment, authenticity, or other factors.

The externally i.e. third party-triggered, qualified post may then be published via one or more social networking platforms for viewing by others, in either a one-to-many or one-to-one sharing format. In some embodiments, the externally triggered post may be transmitted back to the requestor via a direct messaging operation. In some embodiments, a requestor may incur a fee for submitting a content post request.

To ensure users remain motivated to send and receive such posts, certain system constraints may be imposed such as how often a user may receive such requests, and response statistics may be published for the author and/or their friends showing how often they respond to such posts or how long their unbroken streak of responses has gone on. When such a system is successfully implemented, it may operate as if one individual is able to see what is on a remote friend's camera device at any moment simply by tapping a button to initiate a viewing request.

Various other objects, features, aspects, and advantages of the present invention and embodiments will become more apparent from the following detailed description of preferred embodiments, along with the accompanying drawings in which like numerals represent like components.

BRIEF DESCRIPTION OF THE FIGURES

FIGS. 22-25 are flow charts of processes for generating externally-triggered posts.

DETAILED DESCRIPTION OF THE DRAWINGS

Figure 1:
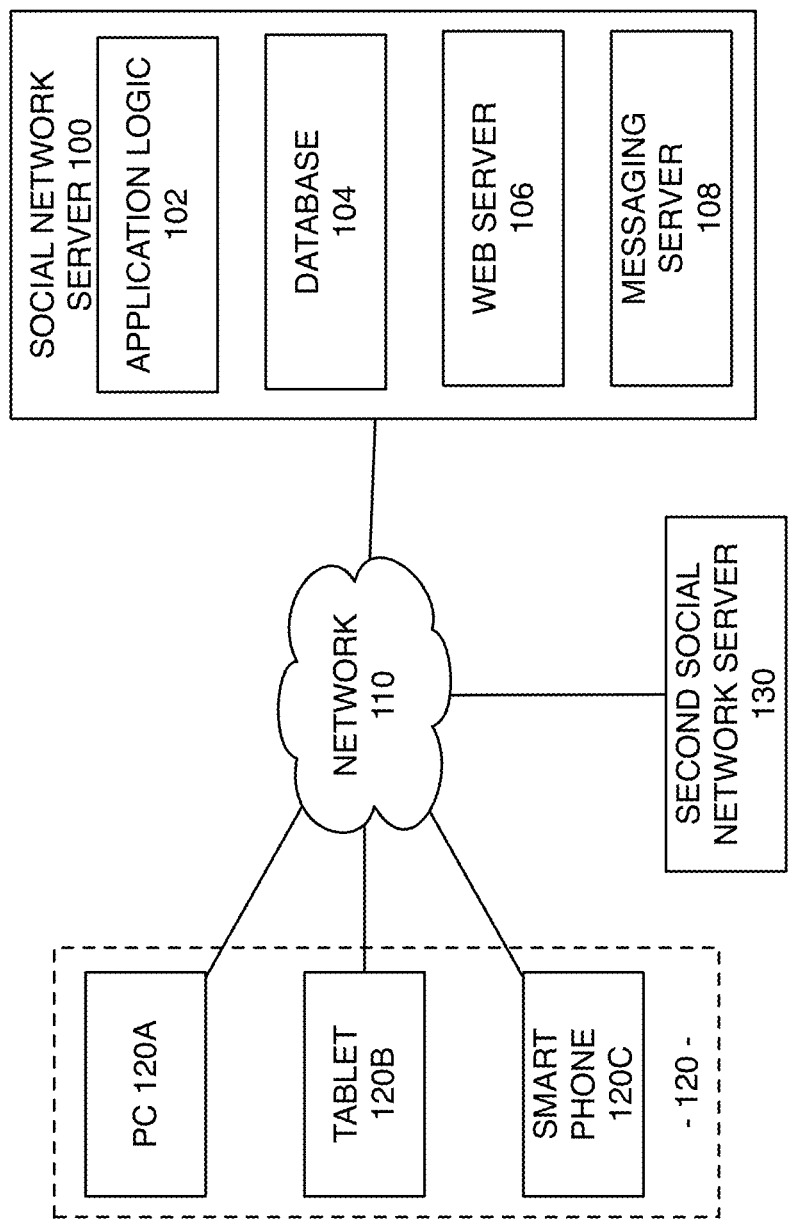
FIG. 1 is a schematic block diagram of a computing environment.

While this invention is susceptible to embodiment in many different forms, there are shown in the drawings and will be described in detail herein several specific embodiments, with the understanding that the present disclosure is to be considered as an exemplification of the principles of the invention to enable any person skilled in the art to make and use the invention, and is not intended to limit the invention to the embodiments illustrated.

FIG. 1 is schematic block diagram of an embodiment of an online communication platform, such as a social media service. Server 100 communicates, inter alia, via computer network 110, which may include the Internet, with user devices 120 such as personal computer 120A, tablet computer 120B and smart phone 120C. While certain illustrated embodiments are implemented using smartphones, tablets or other mobile devices as user devices, it is contemplated and understood that embodiments may also be used with personal computers and any other device that a user may use to capture images or videos, or to access or post to social media or other digital communication services.

Server 100 implements application logic 102, and operates to store information within, and retrieve information from, database 104. The term "database" is used herein broadly to refer to an indexed store of data, whether structured or not, including without limitation relational databases and document databases. Web server 106 hosts one or more Internet web sites and/or Application Programming Interfaces (APIs) enabling outside user interaction with, amongst other things, application logic 102 and database 104. Messaging server 108 enables messaging, such as mobile network messaging service (e.g. SMS or MMS), email, or application notifications, between server 100 and user devices 120.

Second social network server 130 is a network-connected communication platform operating independently from social network server 100. In some circumstances, users may communicate using either or both of social network server 100 and second social network server 130.

While depicted in the schematic block diagram of FIG. 1 as block elements with limited sub elements, as known in the art of modern web applications and network services, servers 100 and 130 may be implemented in a variety of ways, including in a distributed computing environment where tasks are performed by remote processing devices that are linked through a communications network. In a distributed computing environment, program modules may be located in either or both local and remote computer storage media including memory storage devices. That said, the implementation of servers 100 and 130 will typically include, at some level, one or more physical servers, at least one of the physical servers having one or more microprocessors and digital memory for, inter alia, storing instructions which, when executed by the processor, cause the server to perform methods and operations described herein.

Typically, server 100 interacts with user devices 120 to render a user interface, enabling communication of information to users of devices 120 and interaction between user devices 120 and server 100. Examples of user interfaces may include, inter alia, a mobile app graphical user interface rendered on a touch-sensitive display screen of a smartphone; or a web application rendered on web browser software running on a personal computer equipped with a keyboard and mouse. These and other embodiments facilitate implementation of methods and systems described herein.

Figure 2:
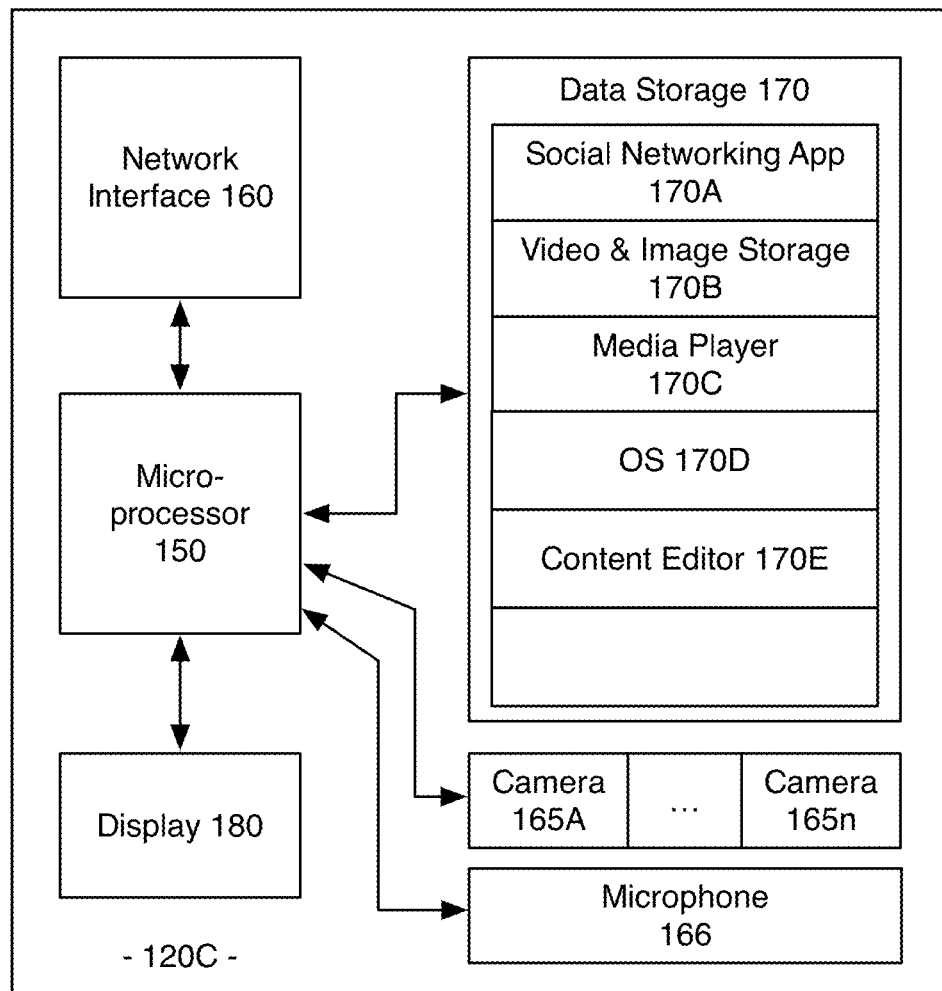
FIG. 2 is a schematic block diagram of a user computing device.

FIG. 2 is a schematic block diagram of an exemplary user device, smart phone 120C. Smart phone 120C includes microprocessor 150. Microprocessor 150 is configured to transfer data back and forth with data storage 170. Data storage 170 includes, inter alia, social networking application 170A, video and image storage 170B, media player 170C, operating system software 170D, and content editor 170E. Social networking application 170A enables interaction between user device 120C and a social networking service, and may be implemented via, e.g., a locally-installed application and/or a web application implemented using web browser software. Video and image storage 170B stores digital video and image content, such as user-generated photos and videos. Media player 170C contains instructions that can be executed by microprocessor 150 to render media content on display 180, such as video clips and images. Operating system software 170D contains instructions that can be executed by microprocessor 150 to implement a computing device operating system. Content editor 170E contains instructions that can be executed by microprocessor 150 to enable a user to interactively modify content including digital images and/or video stored within video and image storage 170B.

Device 120C further includes digital cameras 165A-n, capable of recording digital images and digital video content within video and image storage 170B. Network interface 160 enables data communications with external networks, and may include common communication mechanisms including a cellular modem, Bluetooth interface and/or wireless Ethernet interface. Touchscreen display 180 enables user interaction with device 120C.

It should be appreciated by those of ordinary skill in the art that FIGS. 1 and 2 depict the various computing devices and environments in a simplified manner for purposes of clarity, and practical embodiments may include additional components and suitably configured processing logic to support known or conventional operations and functionality not described in detail herein.

Figure 3:
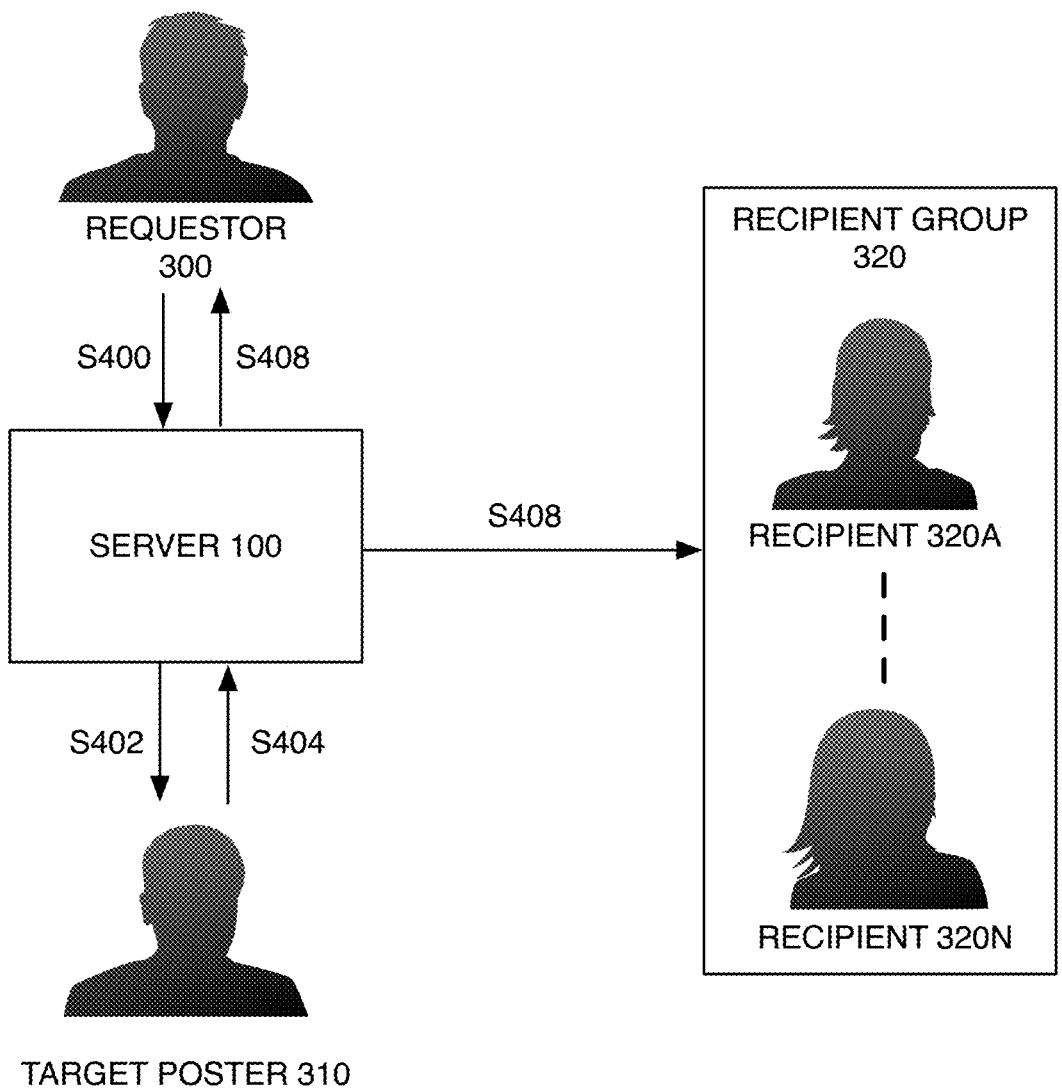
FIG. 3 is a schematic block diagram of individuals involved in requesting, creating and viewing an externally-triggered content post.
Figure 4A:
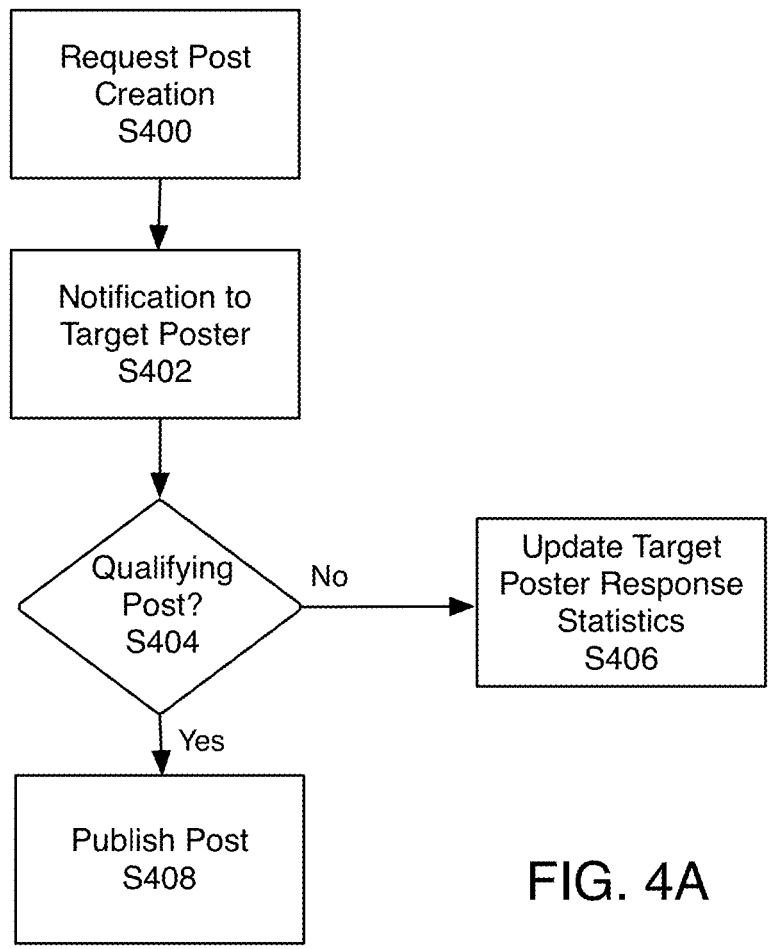
FIGS. 4A and 4B are each flow charts of processes for generating externally-triggered posts.
Figure 5:
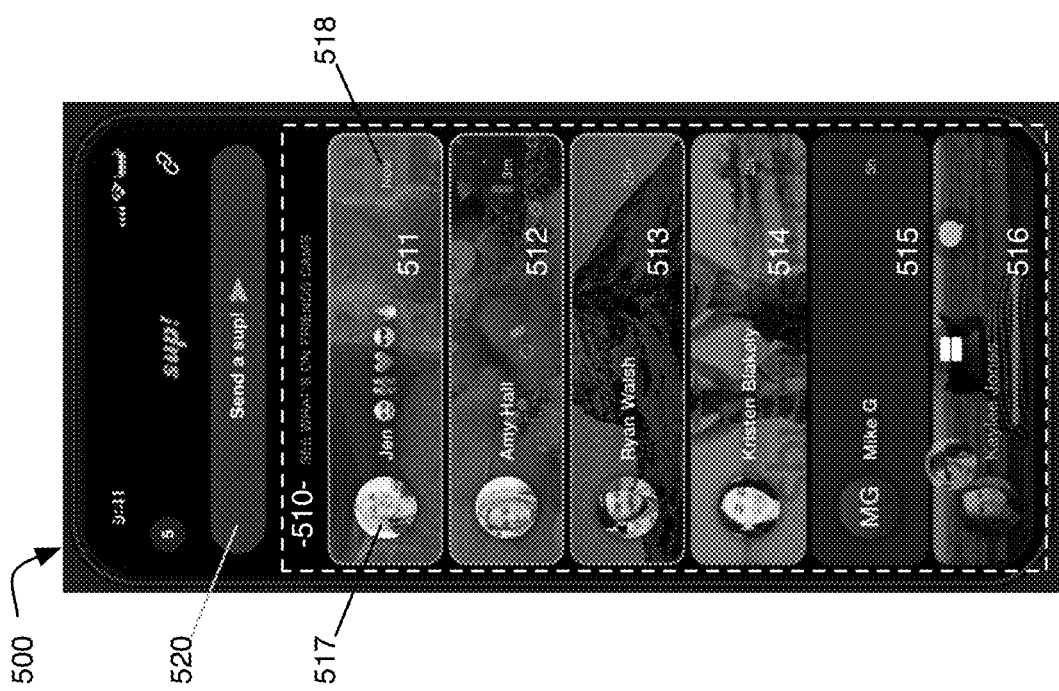

FIG. 3 is a schematic block diagram of parties involved in an exemplary content creation using an embodiment described herein. Requestor 300, target poster 310 and recipient group 320 (including multiple recipients 320A through 320n) may each be, for example, users of a social networking service implemented by server 100. FIG. 4A is a flow chart of a process for generating a third-party-initiated social media post, in the context of FIG. 3. The process of FIG. 4A can be implemented by, for example, the parties of FIG. 3, using devices such as that of FIG. 2, and in a computing environment such as that of FIG. 1. FIG. 5 et seq. illustrate application embodiments that may be rendered on a user device, such as smartphone 120C, while implementing the process of FIG. 4A.

FIG. 5 illustrates an exemplary display 500 rendered by social networking application 170A, as implemented on a smartphone 120C in coordination with social networking service 100. Display portion 510 contains a feed listing social networking connections having recently made externally-triggered content posts, in accordance with embodiments described herein. In the embodiment of FIG. 5, feed 510 is comprised of content post indicia 511-516. Each content post indicia includes an indication 517 of the post author (e.g. profile image and name), as well as content post time indicator 518 conveying how long ago the post was created. Content post indicia 511-516 are rendered in time order, with most recent posts appearing at the top. Display portion 510 preferably comprises a scrollable feed, with further content posts available further below. Content post indicia 511-516 may be tapped or selected by a user to view the associated content post. In the illustrated embodiment, content post indicia 511-516 correspond to a most recent post from an associated user. However, it is contemplated and understood that content posts generated in accordance with methods and systems described herein may alternatively or additionally be presented to users via other content display paradigms, including modes of content display known for use with other types of social media content, such as a user-specific story gallery or direct messaging posts.

Button 520 provides a mechanism for a requesting user 300 to initiate a request for a target poster 310 to create a content post (step S400). In response to selection of button 520, requesting user 300 may be queried to identify a target poster 310 to whom a content post request should be directed. Display 600 (FIG. 6) illustrates an exemplary mechanism for doing so, as implemented by social networking application 170A on smartphone 120C. Display area 610 provides a scrollable list of other users to whom an external content post request may be sent. In some embodiments, display area 610 may be populated with indicia corresponding to other users having a qualifying social network connection to the requesting user, such as a "friend" status with requestor 300 or a prior authorization to provide external content post requests. The target recipient list area 610 may include identifying information for potential target recipients (e.g. image and name listing 611), and a SEND icon 612 selectable to transmit the external content post request.

In some embodiments, additional information may be provided. For example, mechanisms may be implemented to foster regular and predictable responses from users. Such mechanisms may include, amongst other things, cues within the user interface to incentivize request recipients to respond, as well as constraints on sending of requests to prevent requests from becoming abusive or burdensome. With regard to the former, display 600 includes responsiveness indicator 613, indicating the percentage of external content post requests to which the associated user has provided a timely or qualifying response. The response rate indicia provide insight for a request sender into whether a request will be answered or wasted (especially effective as a behavior incentive if sending of requests is limited in supply) and simultaneously serves as an incentive for a request recipient to answer while minimizing how many they skip.

In order to maximize participation and curb abuse or harassment of users, or avoid undesirable user experiences, preferably, system 100 may impose various limitations on sending of post requests to target posters. Such limits may include, for example, a maximum number of requests that may be sent (or received) by a given user per day, a maximum frequency of requests that may be sent (or received) by a given user in a given time period (e.g. per hour), a minimum elapsed time between requests, a maximum number of requests from a given requesting user 300, a minimum time period that must elapse before a given sending user may send a content post request to the same recipient user, or other criteria. For example, in one exemplary embodiment, users may be permitted to transmit up to three post requests within a 60 minute window of time. Once a user has requested three content posts and less than 60 minutes has elapsed since the first such request, the user may be prevented from submitting another content post request (e.g. via disabling of, or preventing access to, user interface elements utilized for requesting content posts) until the number of post requests in the trailing 60 minute window falls below three. Such constraints may be implemented, in some embodiments, by server 100 (e.g. via operation of application logic 102); in other embodiments, such constraints may be implemented by a local application operating on a user device (e.g. via operation of social networking app 170A on user device 120C); in yet other embodiments, a combination of server-side and user device operations may be utilized.

Other types of constraints and operational rules may also be imposed in some embodiments. A cooldown period may be imposed on a user after receiving a request. For example, a system may enforce a minimum number of minutes that must elapse after a user receives a content post request, before another user may send a content post request to the same request recipient. This may be valuable in that if a user receives too many requests in a short period of time, and the recipient's personal circumstances have not substantially changed since the prior request, the user is likely to feel fatigued or overwhelmed with relatively low value requests.

In some embodiments, target recipient list 610 may be displayed in such a manner as to indicate which users are currently eligible to receive an external content request. For example, in the illustrated embodiment, text and icons associated with users eligible to receive requests are rendered in a bright color (e.g. white), while users not eligible to receive a request from a given requestor 300 are rendered by the requestor's app in a muted color (e.g. gray).

Figure 8:
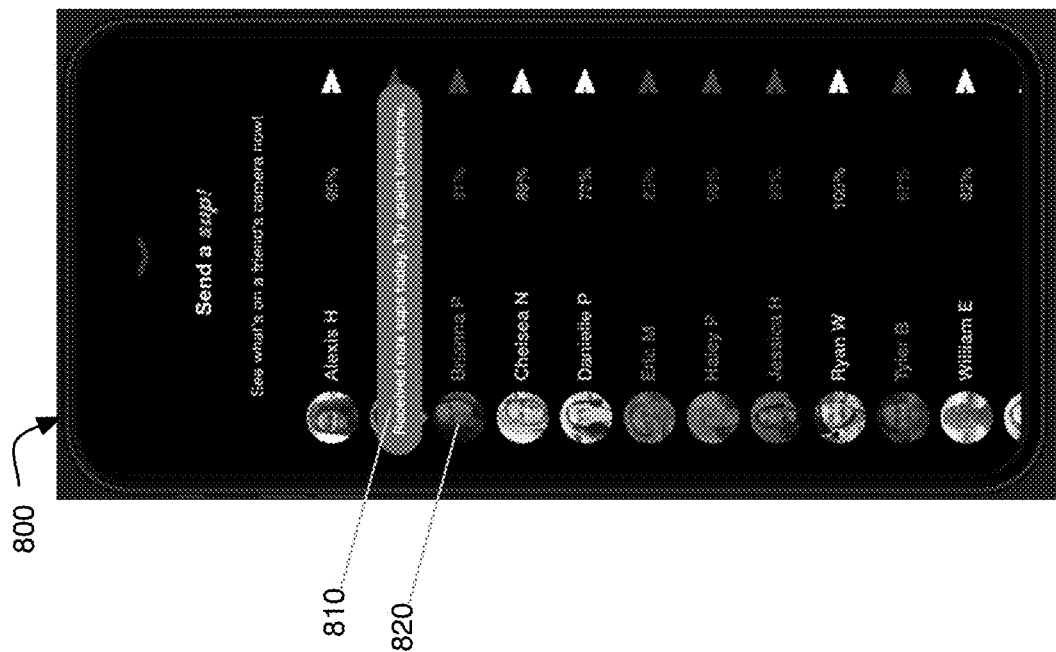
Figure 7:
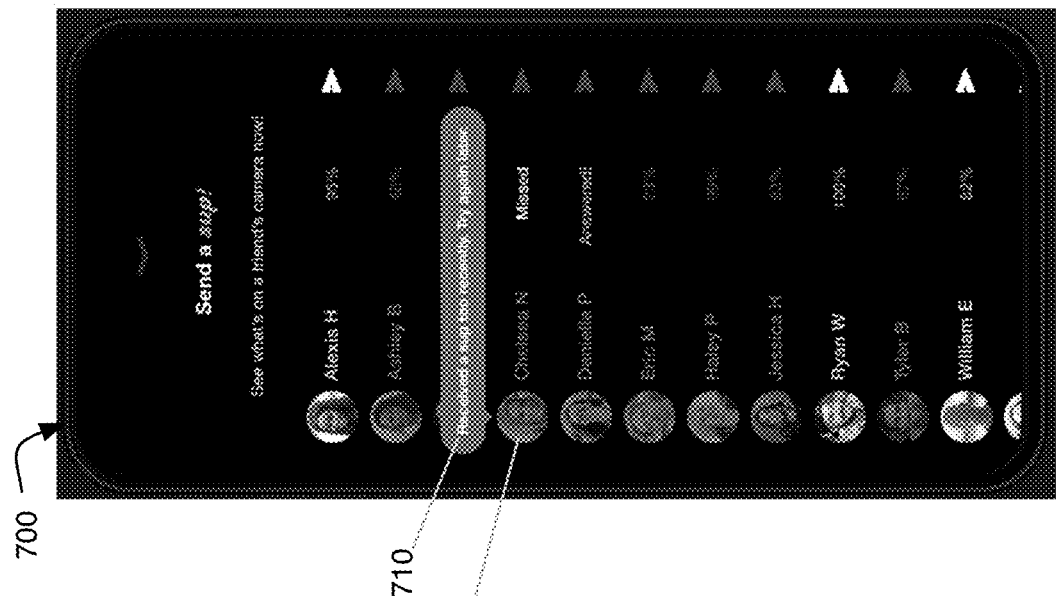
Figure 9:
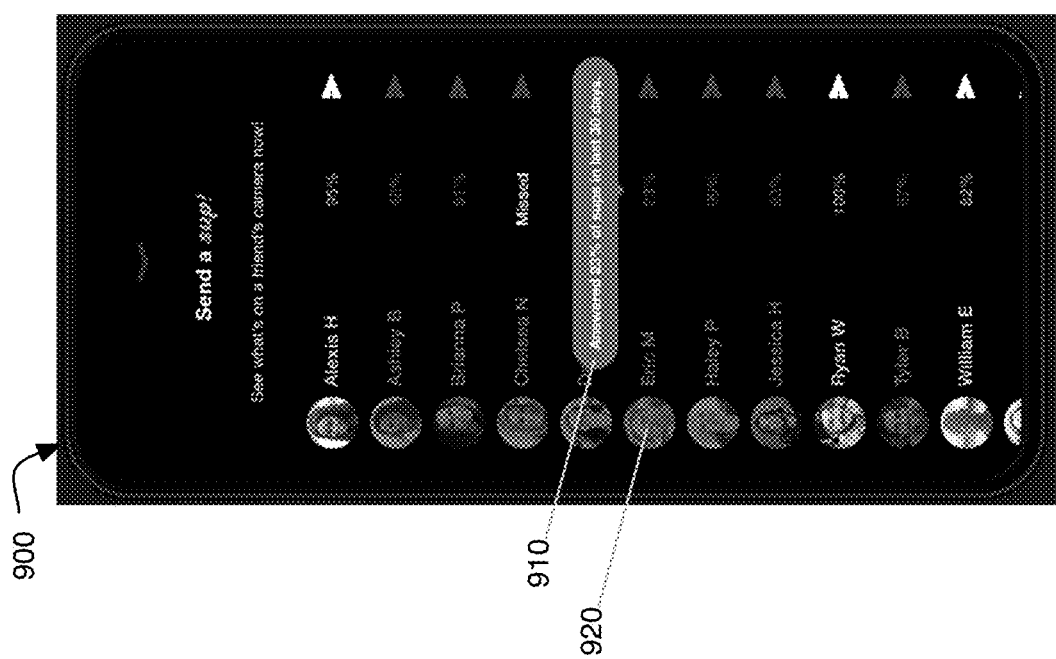

Social networking app 170A may also cause messages to be displayed providing a requestor 300 with feedback concerning options available in the app. For example, in FIG. 7, display 700 includes message 710 indicates that a prospective target poster 720 has received a content request too recently, such that a period of time (such as a predetermined period of time) must elapse before a subsequent content request may be transmitted. In FIG. 8, display 800 includes message 810 confirming that user 820 has received a number of requests exceeding a maximum daily limit. In accordance with another aspect of the display, explanatory messages may indicate the frequency with which a target poster provides qualifying responses to external content post requests. In FIG. 9, display 900 includes message 910 confirming that user 920 has answered 23% of external content post requests received by user 920 in the last 30 days.

Figure 10:
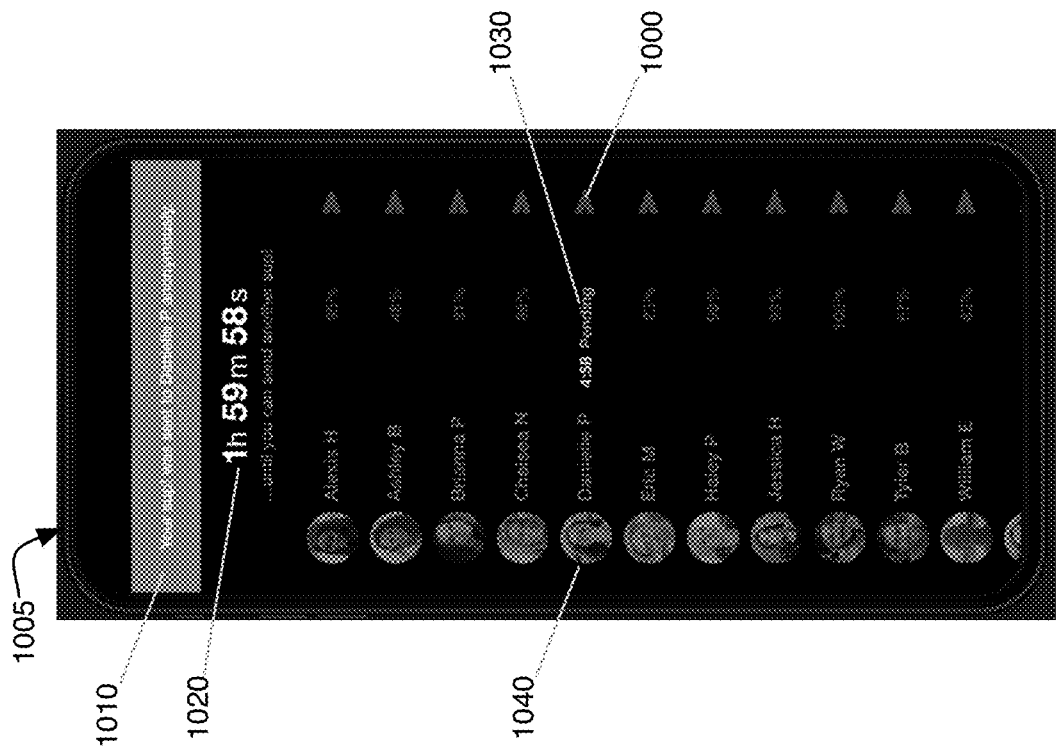

Using the display of potential recipients, a SEND icon 612 may be selected to initiate transmission of a content request from requestor 300 to target recipient 310 via social network service 100. In FIG. 10, in response to selection of SEND icon 1000, display 1005 confirms to requestor 300 that a request was successfully transmitted with message 1010. In embodiments where each requestor is limited to a minimum interval between requests (optional), message 1020 provides a countdown timer indicating the amount of time remaining to elapse between another request may be sent. Timer 1030 indicates the amount of time remaining for a target poster associated with user indicium 1040 to respond to the request. Implementing various constraints may help maintain balanced activity across time and the user base, thus avoiding burden and system failure. Without such constraints, some users may become quickly overburdened while others may be under-burdened or neglected.

While in the foregoing embodiment the content post request is originated by another user of a social network, it is contemplated and understood that in other embodiments, other third parties (i.e. individuals, systems or things not under control of the user from whom the content post is requested) may initiate a content post request from a particular recipient user. For example, in some embodiments, a content post request may be initiated as a result of automated software-controlled functionality of social network server 100. In other embodiments, content post requests may be initiated by a user of a second social network system 130. In yet other embodiments, content post requests may be initiated by bots (i.e. autonomous software agents) which may operate on a social network server such as server 100 or server 130, locally on a third-party user computing system (such as one of devices 120), or on another network-connected computing device. However, in each case, the user to whom the content post request is directed does not determine the timing of the request, thereby removing the time element of content composition from the posting user's control. Further details regarding the timing and recipients of automated post requests initiated by a social networking platform are described hereinbelow.

Referring back to the process of FIG. 4A, in step S402, a content post request notification is delivered to target poster 310, e.g. via mobile app notification from server 100. Target poster 310 may be presented, by a local instance of mobile application 170A, with a notification on smartphone display 180 that a content request has been made. In some embodiments, the identity of requestor 300 may be withheld from target poster 310 (i.e. the request is anonymous). This may increase response rate and serves to differentiate these requests from simple direct messaging requests with one friend asking what the other friend is doing right now. In other embodiments, target poster 310 may be notified regarding the requestor responsible for any given request. In yet other embodiments, requestor 300 may be provided with an option to notify a target recipient 310 of the requestor's identity, or to maintain the request as anonymous.

In some embodiments, a content post request created in step S400 and delivered to a target poster in step S402, may include instructions or specifications for content requested for inclusion in a responsive post. By providing specific instructions or content specifications, a target poster may be discouraged from using previously-generated content, because such content may not be responsive to the instructions or specifications provided in a request. For example, in requesting a post containing video content, the request in step S400 may be specified to include a particular question to be answered by the target poster in a responsive post. If the target poster uploads previously-created content in response, ostensibly with content not responsive to the question posed in the request, then it may be evident to requestor 300 and possibly other viewers of the responsive post that the post content was not, in fact, created contemporaneously with the request. Other examples of specifications or instructions for responsive content that may be conveyed to a target poster in a post request, in order to further encourage contemporaneous content, include: photographing or video recording certain colors, including certain words in a video recording, or including specific content in a photograph or video. In some embodiments, such responsive content specifications may be determined by requestor 300 (e.g. by permitting requestor 300 to specify a question to be answered through a user interface element such as a free form input field or by selecting from a dropdown of system-provided questions, or other content constraints in step S400). In other embodiments, responsive content instructions may be determined automatically or systemically, such as by application logic 102 of server 100 or locally by app 170A implemented on a device 120 used by the requestor and/or target poster. Systematic determination of post content specifications may be random (e.g. via random selection from amongst a set of options), or determined algorithmically (e.g. selected in a manner intended to promote user engagement, based on factors such as user profile information, past communications by relevant users, and/or content instructions demonstrated to have resulted in successful engagement with other users).

In step S404, server 100 monitors for receipt of a qualified content posting by target poster 310. To increase authenticity and reduce editorial control on the part of the post author, conditions may be placed on the timing of target poster 310's content posting to be considered a qualified response to the request of step S400. Preferably these conditions may be automatically imposed by the app interface. Preferably, conditions for a qualified response include creation of the content post in step S404 within a predetermined and narrowly limited period of time following the request of step S400 and/or the notification of step S402, and the qualified post must be generated from the device on which the notification of step S402 was received by the target poster. For example, a target poster 310 receiving a notification via smartphone 120C may be provided with a maximum of five minutes within which a content post generated on smartphone 120C will be deemed a qualified response to the request of step S400.

Optionally, other criteria may be imposed to increase authenticity in addition to, or in lieu of, time constraints, in order for a post in step S404 to be considered a qualified post in response to the request of step S400. For example, in some embodiments, qualifications may be imposed on the content of a target poster's post, such as: (i) requirement that the post contain photo and/or video content; (ii) requirement that the post contain photo and/or video content that includes the target poster (e.g. as may be determined by face recognition performed by an image recognize module, which may be implemented locally on a smartphone 120C used by target poster 310 (such as within social networking app 170A), or implemented centrally by server 100 (such as within application logic 102)); and/or (iii) that the location of target poster 310 at the time of the post in step S404 is within a predetermined radius of the location of target poster 310 at the time of request notification in step S402 (e.g. as may be determined by geolocation functionality implemented by smartphone 120C, as evaluated by social networking app 170A, thereby further ensuring that the target poster's post was made generally from the place they were located when the post was requested). Each of these qualification criterion increases the sense that a requesting user is able to see what is on a friend's device camera(s) at any time by simply initiating a request.

If a qualifying post from target poster 310 is not received in step S404, then the target poster's response statistics may be updated as maintained by server 100 (step S406), with updated statistics reflected in user app views such as indicator 613 in display 600.

Figure 11:
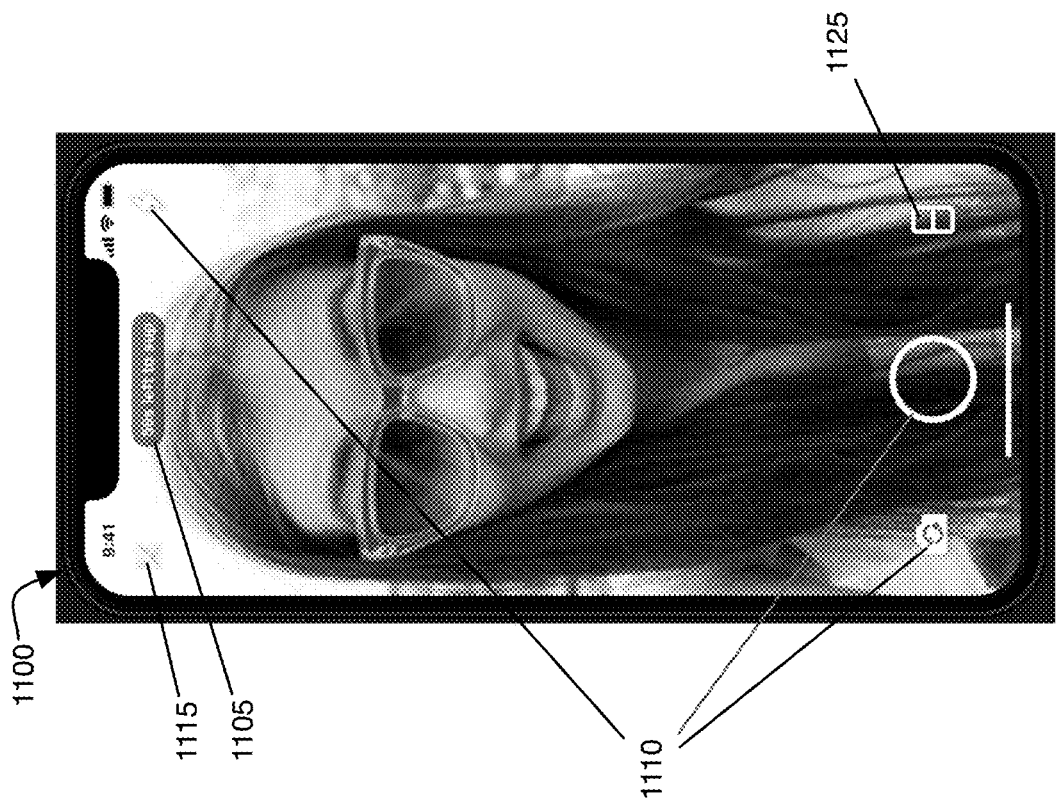

If target poster 310 responds to the notification of step S402, mobile app 170A may automatically provide a user interface specifically for generation of a content post, and such interface may impose limitations that make any such post meet any of the qualifying criteria. FIG. 11 illustrates such a display 1100. Display 1100 includes time notification 1105, communicating to target poster 310 the amount of time remaining to provide a qualified post in response to the request of step S400. Standard camera controls 1110 may be provided for post creation.

Figure 4B:
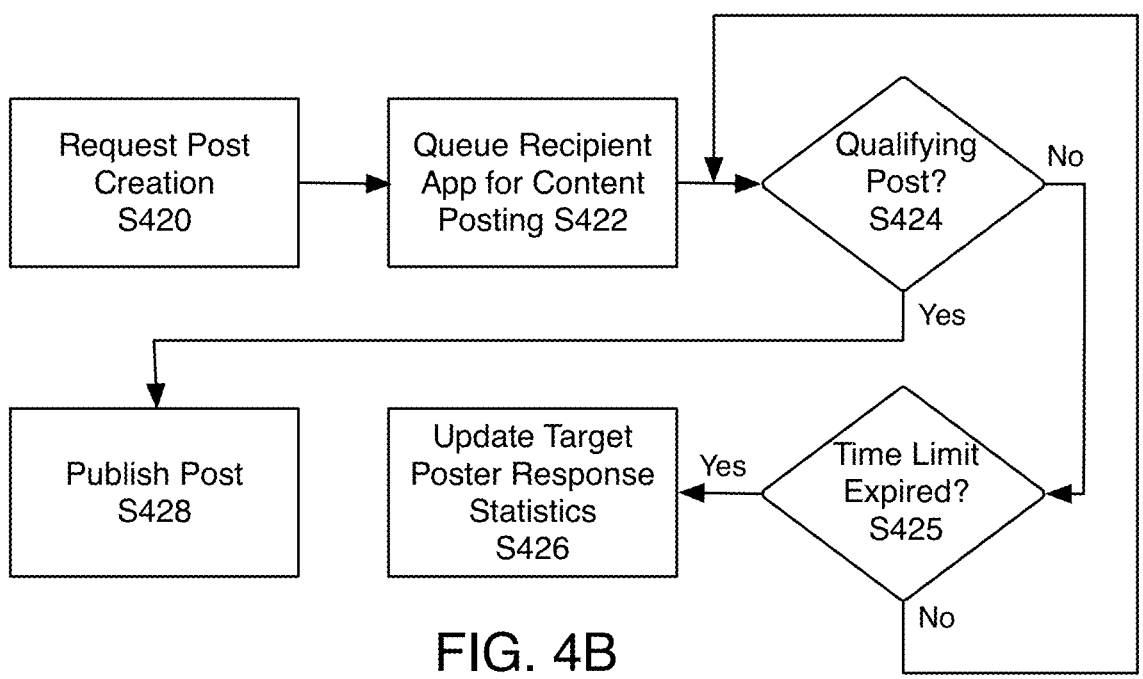

In some embodiments, a target poster may be precluded from accessing other functionality of mobile app 170A (i.e. "roadblocking" certain app functionality) until such time as a responsive content post has been created and submitted—thereby further encouraging target poster 310 to provide a timely and authentic response. Roadblocking of app functionality may be imposed in addition to, or in lieu of, a specific time limit for creating a responsive post. For example, in some embodiments, a specific time limit may be imposed, during which the user must submit a qualifying content post (e.g. newly created, containing newly-captured video or photo content). FIG. 4B illustrates a process that may be implemented by mobile app 170A operating on smartphone 120C, in accordance with such an embodiment. In step S420, a content post request is initiated by a third party, such as another user of social network server 100, a user of third-party social network server 130, or an autonomous software bot operating on a network-connected device. In step S422, the content post request is received by an application (e.g. a mobile app) implemented on a device associated with the content post recipient user (e.g. smartphone 120C). In step S424, a determination is made as to whether the recipient of the content post request has submitted a qualifying content post via social network server 100. If so, the responsive, third-party initiated content post may be published (step S428). If not, a determination may be made as to whether a time limit for submission of a qualifying content post has elapsed (step S425). Time limits may be determined by server 100, locally by a user device 120 (e.g. using social networking app 170A), or via a combination of information on and interactions between server 100 and a user device 120. If the time limit has not expired, monitoring may continue for creation and submission of a responsive content post (i.e. return to step S424). If the predetermined time limit has elapsed without a qualifying content post having been submitted, the third party-initiated content post request is deemed skipped and user response statistics may be updated accordingly (step S426).

In another embodiment, a specific time limit may not be imposed on a user to provide a responsive content post, but the user receiving a content post request may be precluded from accessing displays for viewing other users' content posts until such time as a responsive content post is provided. This type of roadblocking may not impose hard editorial control over the timing of a user's content composition, but may encourage a user to respond promptly by withholding access to app content or features.

In another exemplary embodiment, a user may not be provided with a notification of having received a content post request, but upon opening mobile app 170A after receiving a content post request, the user may be provided only with a content post authoring display (e.g. display 1100 of FIG. 11) until such time as a responsive content post is provided, precluding all use of the mobile app 170A other than content post creation upon receiving a content post request. While fixed or hard time limits may not necessarily be provided in such an embodiment, the element of surprise created by automatic initiation of a content post authoring display, coupled with roadblocking to prevent access to other functionality, may nevertheless remove editorial control over the timing of a user's content post creation, resulting in a more authentic or candid content post.

Content post authoring tools provided by mobile app 170A may be utilized to further encourage authentic and candid content posts. For example, mobile app 170A may initiate an auto-actuating camera, such that upon opening mobile app 170A after having received a content post, the user is presented with a content post creation display (e.g. display 1100) further having a countdown timer display, and upon expiration of such timer, one or more of cameras 165 are actuated to capture photo or video content for inclusion in a responsive content post (although the existence of the timer is optional and actuation may occur with no countdown at all in some embodiments; in other embodiments, the timer may be overridden with manual actuation of a camera shutter indicium). Another example of app-imposed limitations on user editorial control may be a limitation of the number of "re-takes" a user may cause for a qualifying content post responsive to a third-party content post request. For example, in some embodiments, a user may be provided with a single opportunity to capture a photo or video for a responsive content post request; in other embodiments, a user may be provided with some limited number of permissible retakes (e.g. 1 or 2 retakes).

Another mechanism for removing user editorial control over content post creation in response to a third party content post request is by requiring that a content post be authored and posted prior to closing or backgrounding mobile app 170A; thus, a user may not have a hard time limit in order to submit a qualifying content post, but the user must do so before performing any other function on the user's device. If the user closes or backgrounds mobile app 170A prior to submitting a qualifying content post (or activates some other control allowing the user to skip making a qualifying post in order to continue in the app), the content post request is deemed to be skipped and the user's participation metrics (as described elsewhere herein) may be negatively impacted. Such embodiments may be particularly effective when the user receiving a content post request is not provided with a notification outside mobile app 170A, preserving a component of surprise to the user upon opening mobile app 170A.

Figure 12:
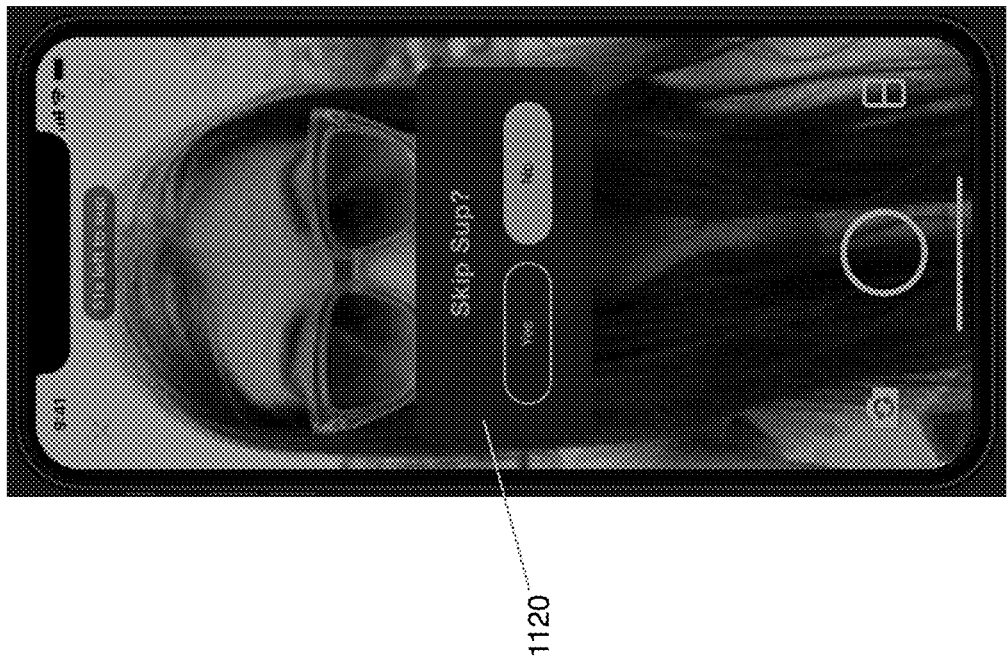
FIGS. 11, 12, 13, 14, 15A, 15B and 16 are mobile device displays of user interfaces for creating externally-triggered posts.

In other embodiments, target poster 310 may be permitted to cancel post creation, e.g. by selection of cancel icon 1115 in display 1100; a user dialog warning 1120 (FIG. 12) may be provided to confirm that the user will skip generation of a responsive content post. In yet other embodiments, the target poster may be presented with a button overlaying their current view(s) indicating they have a request waiting, which may have a timer representing the time remaining to respond. Tapping the button or taking another action in the app, such as leaving their current view, may cause the post process to begin.

Figure 14:
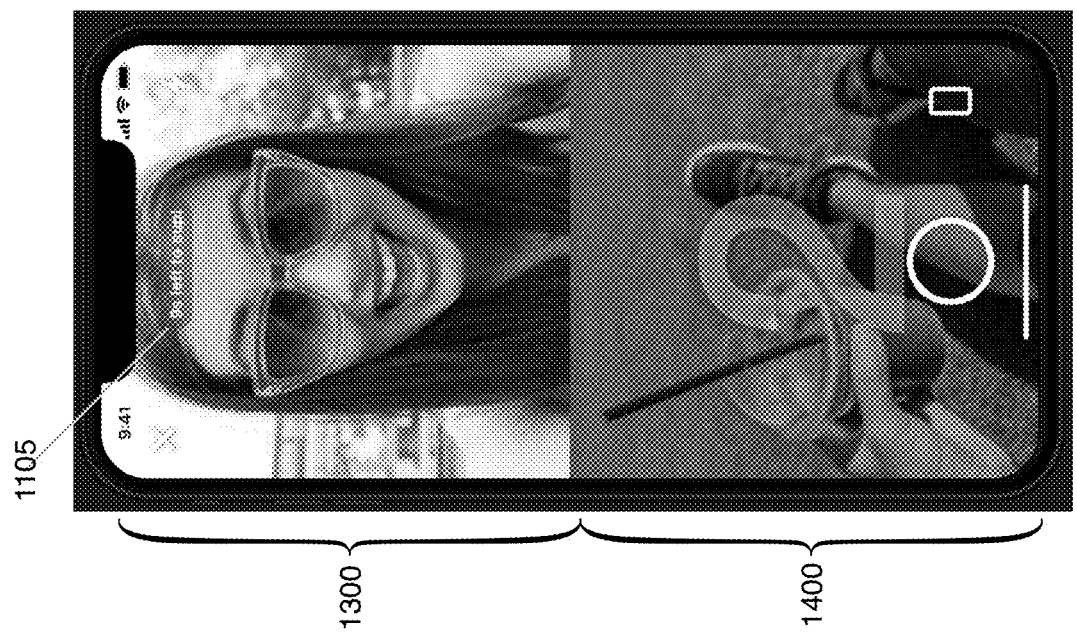
Figure 13:
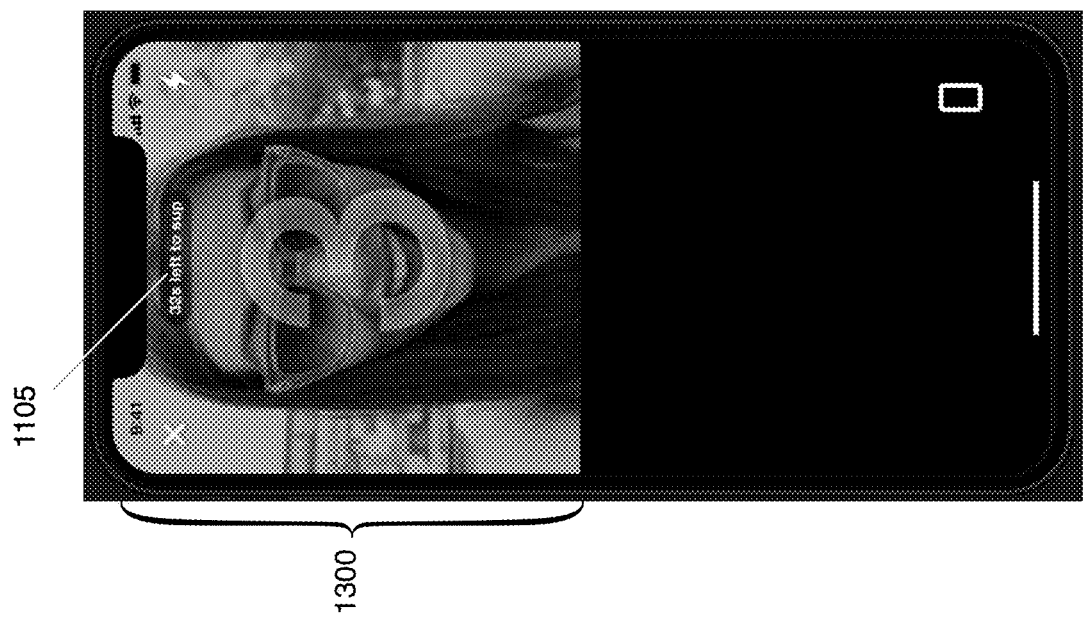
Figure 15B:
Figure 15A:
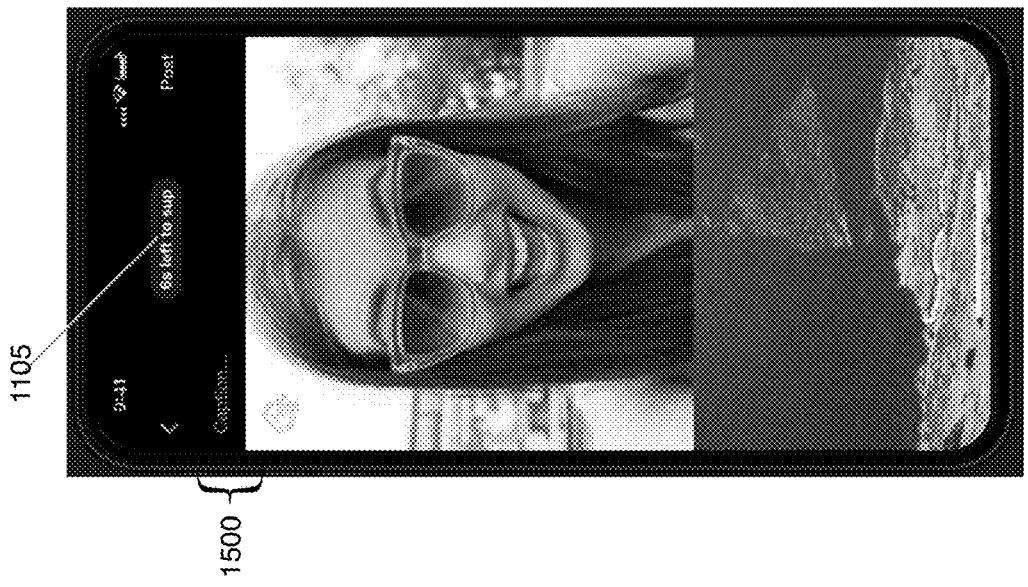

As described herein, in some embodiments, one benefit that may be provided by externally-triggered social network posts is promoting the sharing of more authentic and immersive moments. To that end, in some embodiments, it may be desirable for posts responsive to external requests to be generated using both front and rear cameras on a smartphone 120C. Such combination images may provide a viewer with insight into not just the current status of the target poster, but also the current environment in which the target poster finds himself or herself at or near the time of the request. To that end, multiple camera image capture may be initiated by a user (e.g. via selection of a dual camera capture indicium 1125), or in some embodiments, enforced by mobile app 170A by automatic operation of content post workflow. FIG. 13 illustrates an initial step in generating a front/rear camera content post, with a front camera image displayed in region 1300. FIG. 14 illustrates a subsequent step, with front camera image remaining in region 1300, and a rear camera image having been captured by smartphone 120C and inserted in region 1400. FIG. 15A illustrates a further step, whereby a user is prompted to enter a text caption in region 1500, to accompany the dual image content post. FIG. 15B illustrates yet a further or alternative step, allowing a user to add stickers, text, or other filter overlays to their post using tools 1510, to provide further expression or definition for the moment captured.

In some embodiments, to further encourage authentic, in the moment posts, a target poster's use of mobile application 170A following a notification in step S402, may initiate automatic actuation of one or more cameras within the target poster's smartphone 120C, thereby further helping ensure that the target poster shares an impromptu and authentic moment. For example, a first countdown timer may provide a user with a few seconds notice prior to actuation of a front camera, followed by a rear camera display with a second countdown timer providing the target poster with a few seconds notice before actuating the rear camera. The impromptu, automatically-taken front and rear camera images may then be combined into a qualified content posting published in step S408.

Figure 16:
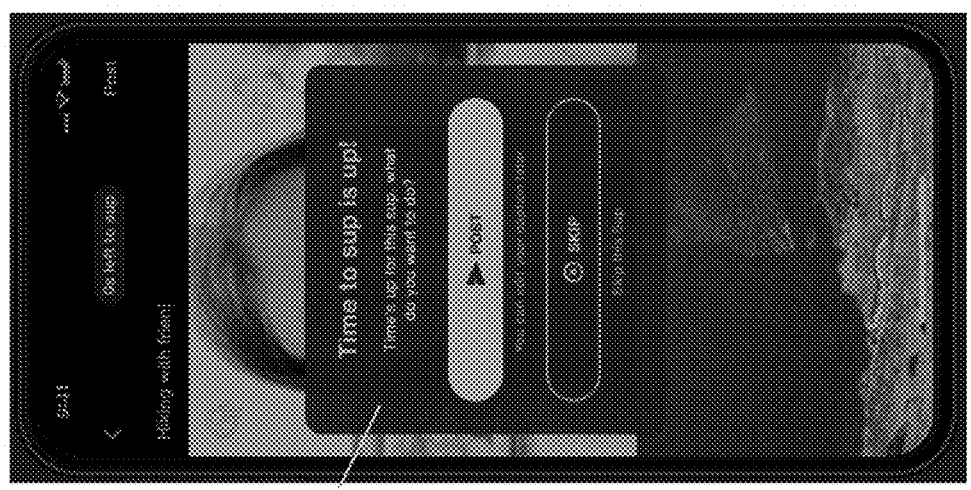

Because qualified content post generation is preferably time-dependent, even if images are not automatically taken, content post generation displays will preferably include countdown timer 1105 providing the target poster 310 with an indication of the maximum amount of time remaining for a post to be deemed a qualified response to the request of step S400. In the event that countdown timer 1105 expires in the midst of a content post creation, mobile app 170A may present target poster 310 with dialog 1600 (FIG. 16), providing an option to either publish the in-progress content post (step S408), or skip the opportunity to submit a qualified content (continuing to step S406).

While it may be desirable in some implementations for externally-triggered content posts to include photo or video content taken at the time of submission (i.e. not selected from a mobile device camera roll), in other embodiments, users may be permitted to select a previously-stored image or even post content items comprising only text. While such content items may not visually depict the target poster's current circumstances, they may still provide insight into the target poster's then-current thoughts or frame of mind.

Figure 17A:
FIGS. 17A, 17B, 17C, 18A, 18B, 19, 20 and 21 are further mobile device displays of user interfaces for interactions relating to externally-triggered posts and systems implementing such posts.

In step S408, target poster 310 submits a qualifying content post to server 100, which is then published or made available via a social networking platform implemented thereon. FIG. 17A illustrates a display 1700 associated with requestor 300's instance of mobile application 170A on a smartphone 120C, comprising an update of the display of FIG. 10 in response to submission of a qualified content post by target poster 310 in step S404. Field 1030 in FIG. 10 is updated in field 1710 to notify requestor 300 that target poster 310 has provided a qualified post responsive to the request of step S400.

Qualified content items published in step S408 may be displayed to users in any of a variety of manners. In some embodiments, users within a recipient group 320 (which typically may also include requestor 300) will receive a notification that a qualified post has been submitted by a target poster 310 having a predetermined social networking connection with the recipient group member. Such notifications may come in the form of push notifications sent via the app, or by the presence of the poster's avatar or the decoration of a user's avatar, in a feed or gallery view. In other embodiments, only the requestor 300 may receive a push notification, but the qualified post may be displayed by server 100 to recipient group 320 or other users. For example, FIG. 18A illustrates display 1800, providing an exemplary feed of qualified content posts from target posters having a predetermined social networking relationship with the viewer.

Figure 17C:
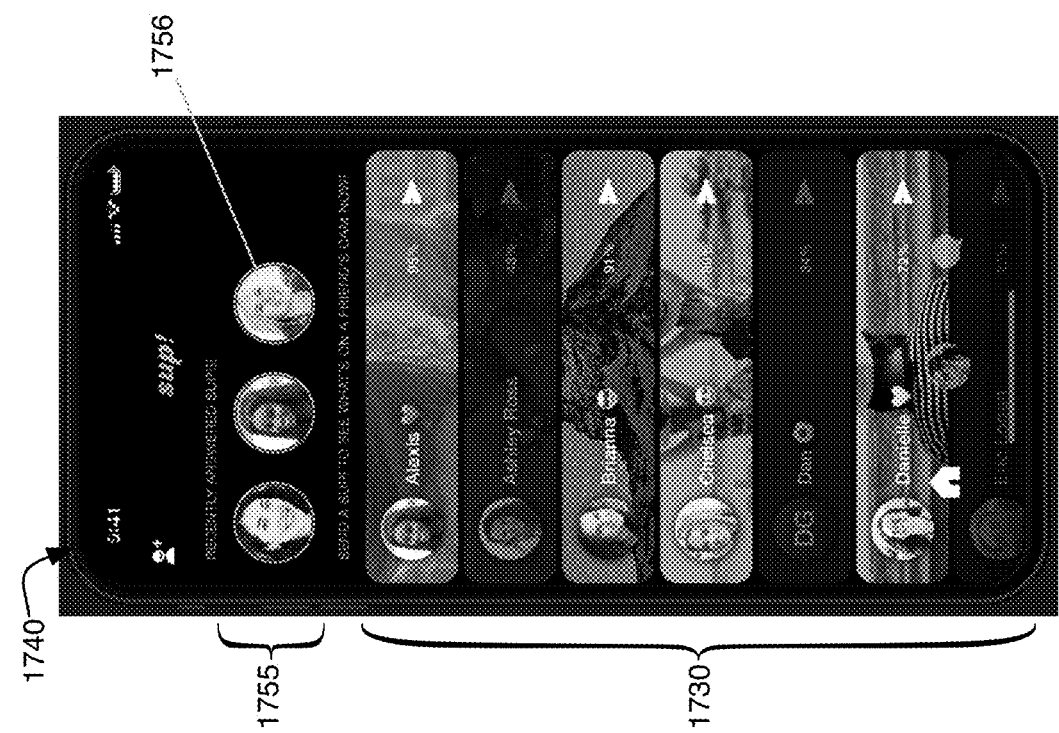
Figure 17B:
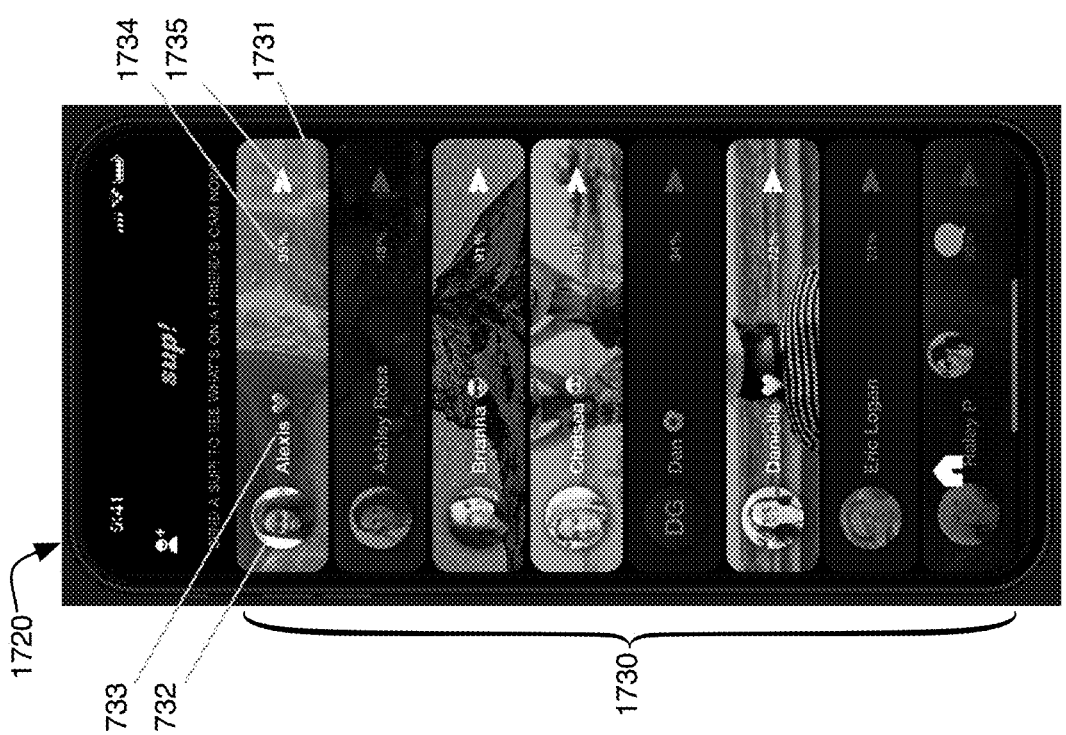
Figure 18B:
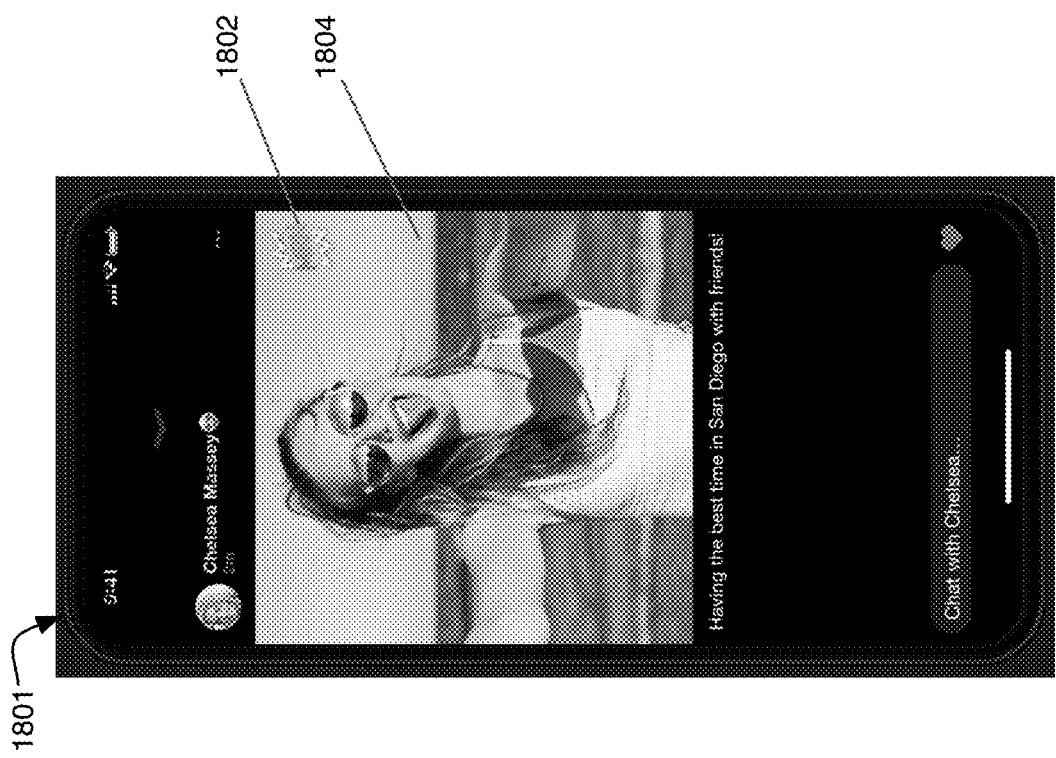
Figure 18A:
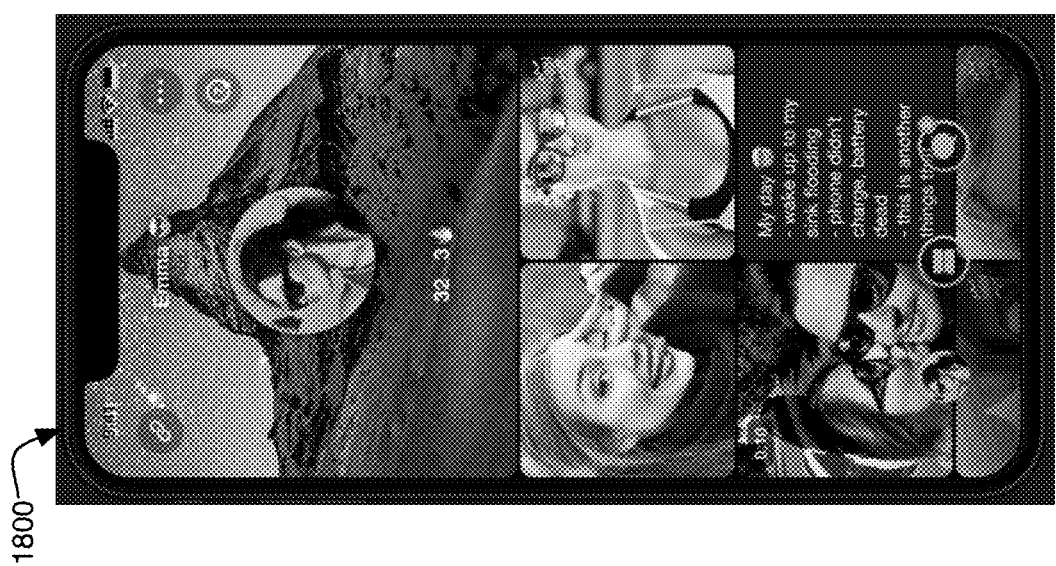

The embodiments of FIGS. 10, 17A and 18A provide separate user interface displays for sending post requests and displaying responses to post requests. However, in other embodiments, a single display may be utilized for sending externally-initiated social media posts, and notifying users of (and preferably providing quick access to) externally-initiated social media posts from others. FIGS. 17B and 17C illustrate such an embodiment. In FIG. 17B, display 1720 includes an array of user indicia 1730 (e.g. user indicium 1731), each providing a profile photo icon (e.g. profile photo 1732), user name (e.g. user name 1733), user metric (e.g. user metric 1734) and SEND button (e.g. SEND button 1735). Preferably, user indicium 1731 is filled with a user-configurable image. In some circumstances, the background image may be derived from a user's most recent or prior posting.

FIG. 17C illustrates the embodiment of FIG. 17B, further including notifications of externally-initiated postings by others. In the event that another individual, having a predetermined social networking relationship with the user viewing display 1740, submits a posting (e.g. step S408), a notification tray 1755 is rendered above array of user indicia 1730. Notification tray 1755 includes one or more posting indicia 1756, each indicative of an externally-initiated content posting. Each indicium 1756 may be selected (e.g. tapped, on a touch-sensitive display) by a user to view one or more content postings associated with the notification.

In some embodiments, content posts published in step S408 may be disseminated to user groups configured for other purposes, and/or configured via third party social networking platforms, such as publication to a Snapchat private story, publication to Instagram Close Friends, publication to all Instagram followers, or publication to all Twitter followers. Thus, some embodiments may involve integration between one platform for requesting and generating externally-triggered content posts, and third party social networking applications (such as Facebook integrated via Facebook Platform, Instagram, Snapchat integrated via Snapkit, or Twitter) on which such externally-triggered content posts may be disseminated for viewing by others.

In some embodiments, recipient group 320 may be defined generally, for all externally-triggered content posts by a target poster 310; in other circumstances, a target poster may be provided with an option to specify a recipient group 320 in connection with each externally-triggered, qualified posting.

In some embodiments, the social networking platform may be a direct messaging platform. Requests would be sent via message in the messaging platform to the target responder, either anonymously or not, and qualifying responses may also be sent as a message through the messaging system, either directly and privately to the requestor, or to a group of friends organized within the messaging system (e.g. a new or previously started group chat. In other embodiments, the response may appear to all friends of the post author via a story style post, similar to how story posts appear in Facebook Messenger, WhatsApp, or other messengers.

As described above, to the extent that third party-initiated post requests are initiated by a social networking platform (e.g. server 100) in an automated fashion, the timing and/or recipients of such system-initiated requests may be optimized to, e.g., maximize user engagement, enjoyment, authenticity, or other factors. Such automated techniques for selecting request recipients, and determining the timing of requests, may be beneficially employed in a variety of applications, including direct messaging embodiments, specialized social networks focused on third party-initiated posts, as well as mixed social networking environments with author-initiated and third party-initiated posts.

For example, a group of users may be identified for contemporaneous notification (e.g. simultaneous, substantially-simultaneous or close-in-time notification) of a system-initiated request for a post, with qualifying responses to be shared amongst the identified group. Such an embodiment may encourage highly candid or authentic content sharing as part of a shared experience amongst a defined social group.

FIG. 22 illustrates an exemplary process that may be utilized in this and other embodiments, for system-initiated posts with systematically-determined request recipient groups and request timing. In step S2200, server 100 selects a recipient group of one or more users for receipt of a platform-initiated post request. In most instances, the selected recipient group will be a proper subset of the platform user base, i.e., the system will select some but less than all of the available users, although it is contemplated that in some circumstances a system could elect to include all system users in a particular recipient group. In some applications, the recipient group of step S2200 may be selected algorithmically based on factors including, without limitation: the frequency with which users communicate with one another, the recency of communications between users with a prospective group, information within a user's platform profile (e.g. shared interests, physical proximity, age, club membership, school attendance), historical responsiveness of users to third party-initiated post requests, the time since a user's last third-party initiated post request or request for a qualified post, certain users having previously matched for communication such as within a dating application, or the like. Such factors may be utilized (e.g. by server 100) to identify recipient groups by application of rules (such as filters or other Boolean logic criteria), by using machine learning techniques (as described further below), or by combinations thereof (e.g. application of a machine learning algorithm to identify an initial subset of candidate request recipients, followed by filtering based on objective criteria to further refine the set of request recipients).

In step S2205, server 100 may determine a time at which the user group identified in step S2200 will be notified of a system-initiated post request. In some embodiments, the request time may be random or based on random (such as a random time within a range filtered to exclude undesirable times, such as very late at night or very early in the morning). In others, the request time may be selected in a manner as to optimize for a desired outcome, such as maximizing the likelihood of receiving a response from platform users generally. In other embodiments, the request time selected in step S2205 may be selected based at least in part on the recipient group selected in step S2200. For example, server 100 may evaluate the distribution of posting times from users within the selected recipient group, and select a request time during a period in which the recipient group as a whole is most or least active on the platform (e.g. to increase likelihood of response time, or to encourage authentic content creation at times users may not ordinarily think to share their current status but for which friends would appreciate such personal insight).

While in some embodiments a single time may be selected, at or about which all of the users within the selected recipient group will receive a request (i.e. contemporaneous notification), in other embodiments the request timing may be determined on an individualized basis. For example, the system may initiate a request to a friend group, but each friend in the group may receive the request at a different time. Differing request times on a per recipient basis may be selected e.g. to optimize the likelihood of each recipient responding (such as based on each user's historical frequency of posting at different times) or based on a time zone in which each user currently resides (e.g. such that each recipient receives the request at the same or similar time of day based on their present location).

While certain embodiments may contemplate identification of a notification time, it is contemplated and understood that such notification can be achieved in a number of different ways. For example, a user may be notified of a request at a particular time by a social networking platform server initiating transmission of a user notification (e.g. a push notification) at a specified time. In such embodiments, contemporaneous notifications may be achieved e.g. by the social networking server transmitting a single notification message to multiple user devices, or by transmitting a sequence of notification messages in close succession to different users. Alternatively, a social networking server may convey instructions to a software application operating on a local user device (e.g. social networking app 170A operating on device 120C) at a time prior to the intended time for user notification, containing instructions causing the local software application to initiate a user-facing notification at the selected time. In other circumstances, the local social networking app may determine the time based on code running locally, and may use as inputs local data available about the user and/or their behavior on the social networking app, data accessed or otherwise made available by a social network server, data accessed by a local app on a user device combined with data accessed on a remote local app of another user, or any combination of these.

While the process illustrated in FIG. 22 begins with selection of request recipients, and then determines a request time, it is contemplated and understood that in other embodiments, the order of such steps could be reversed. For example, a platform may first select a request time based on a desire to encourage new content during that period (e.g. during a period in which posting activity may otherwise be slower), and subsequently select a recipient group (in which case, e.g., recipients may be selected at least in part on a user's likelihood of posting content during the selected request time).

In step S2210, a system-originated post request is sent to the users identified in step S2200, at the time determined in step S2205. The request preferably imposes at least one editorial constraint on a qualifying response, such as: time period during which the responsive post must be captured or posted; location at which the responsive post is captured; a feature roadblocking constraint; or other constraints or combinations of such constraints, as discussed elsewhere herein.

In step S2215, the platform publishes at least the qualifying posts (i.e. posts meeting the imposed editorial constraints) responsive to the request notification of step S2210. Such content may be published in any number of manners. For example, when a request is initiated from within a direct messaging or chat group in step S2200, in step S2215 qualifying responsive posts may be published directly to the direct messaging or chat group from which the request was initiated. In some embodiments, publishing may only occur after all users receiving requests have responded with qualified posts (e.g. two users matched in a dating app may only see each other's posts after both have responded with qualifying posts, e.g. which may then unblock other roadblocked features such as the ability to view each other's posts, and/or to chat with each other.)

In some embodiments, steps S2200 and/or S2205 may be implemented using machine learning techniques. In particular, a machine learning algorithm may be implemented by server 100 and utilized to select a group of request recipients in step S2200, as well as determining request timing in step S2205. In such embodiments, subsequent steps (e.g. user responses to requests in e.g. steps S2210 and S2215) may be utilized to provide training feedback, such as by reinforcing weighting of group selection criteria and request timing that resulted in a high participation rate amongst post request recipients, and reducing the weight of group selection criteria and request timing that resulted in lower participation rate. In such a manner, server 100 may continually improve over time in using system-initiated post requests to promote engagement with the platform.

While certain embodiments described herein are described with reference to functions being implemented by a centralized platform component, e.g. server 100, it is contemplated and understood that in other embodiments, many such functions may alternatively or additionally be performed by a decentralized component, such as a user's app 170A operating on a user device 120. For example, a user app 170A may evaluate a user's communications with other users via the social network, to select a group of one or more recipients with whom the user communicates regularly (step S2200), as well as a time of day in which the selected users are historically responsive to communications (step S2205), in order for app 170A to initiate a post request to the selected group at the determined time (step S2210). A social network using such decentralized processing techniques may be used to implement any embodiments described herein and no centralized server may be used at all.

Figure 6:
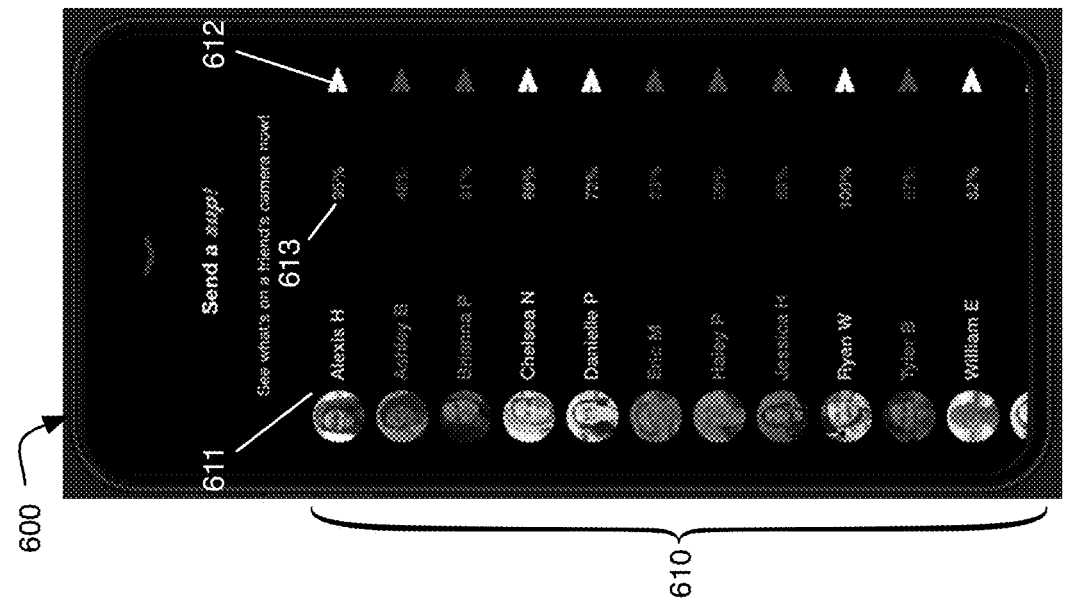
FIGS. 5, 6, 7, 8, 9 and 10 are mobile device displays of user interfaces for requesting externally-triggered posts.

While the process of FIG. 22 provides another exemplary process for system-initiated requests, numerous variations of user-initiated requests are also contemplated. For example, in FIG. 23, a requesting user selects another user or group of users for receipt of a post request (step S2300). While FIG. 6 illustrates an exemplary user interface with single-action user interface elements (e.g. element 612) associated with a particular recipient user within a list of prospective recipients, in other embodiments, such single-action user interface elements for initiating third-party requests to post may be embedded within user interfaces for other social networking functions, such as a chat or direct message interface, within a contacts list, in a story gallery display, or within a feed proximate another user's avatar. In step S2305, an editorial constraint is selected for imposition on qualifying posts responsive to the request. In some embodiments, the constraint selection in step S2305 may be performed by the requesting user, e.g. via selection of a constraint within a pop-up list of constraints displayed on the requesting user's app user interface. In other embodiments, the constraint selection in step S2305 may be performed by the social networking platform (e.g. server 100). Constraint selection in step S2305 by the social networking platform may be e.g. random, or determined algorithmically to maximize the likelihood of receiving qualifying, authentic responses from the selected recipient(s). In step S2310, the post requests configured in steps S2300 and S2305 are sent to designated recipients, and in step S2315 content posts submitted in response to the requests of step S2310 may be published.

Optionally, it may be desirable for a user to initiate a request for a time-limited or otherwise editorially-constrained post to a group of other users, such as a group of friends, but for the initiating user to also participate in the responsive postings. However, the authenticity-inducing character of the third party-initiated post may be lost for the requesting user, if the requesting user is fully in control of the time of the post request. FIG. 24 illustrates a further embodiment, which may be utilized to address such circumstances and permit a requesting user to participate in a user group request for posting with some degree of authenticity.

In step S2400, a requesting user selects one or more other users for receipt of a user-initiated post request with editorially-constrained (e.g. time-limited) response. In step S2405, the requesting user initiates the post request with server 100. In step S2410, server 100 delays for a period of time unknown to the requesting user (e.g. a random period of time, or a random period of time separated from the time of submission in step S2405). The delay period in step S2410 may be, by way of examples, between 1 and 4 hours, or anytime in the ensuing 24 hours. In step S2415, post requests are sent. In the case of a random delay period in step S2405, the requesting user may still be surprised by, or otherwise unable to fully plan for, the request, towards encouraging the capture of an authentic moment.

In accordance with another aspect, system-initiated post requests may be utilized by a social networking platform as a mechanism for stimulating regular on-platform interaction amongst friends, but allowing users to opt-in to friend groups that receive periodic time-limited (or other authenticity constraint) system-initiated requests for content postings to be shared amongst the group.

FIG. 25 illustrates a process by which such a system may be implemented. In step S2500, a group of users is formed and stored by server 100. In some embodiments, the group of users may be opted-into by the group members. For example, an initial user may invite one or more other users using a user interface and functionality implemented by mobile app 170A interacting with server 100. Invited users may similarly receive notification of, and accept or reject, such invitations via their own instances of mobile app 170A. In some embodiments, invitations in step S2500 may be transmitted via direct message or group chat functionality of a social networking platform. In some embodiments, invitations in step S2500 may be initiated to members of a group story. In other cases users may be opted-in by their friends or by the system, and may later have to choose to opt out of receiving such requests for the group or for the system entirely.

In step S2505, server 100 periodically initiates system-initiated requests, in a manner described elsewhere herein (for example, using processes of FIG. 4A, FIG. 4B, or FIG. 22). In an embodiment, the requests of step S2505 may be initiated by server 100 once per day at a random time each day (or a random time within a range, e.g. to avoid very early or very late post requests which may further be restricted by the time zone of each user). The timing requests of step S2505 may optionally be optimized (e.g. via machine learning algorithm or rules, implemented by server 100) in order to maximize the likelihood of response by users within the group formed in step S2500. Additionally or alternatively, the timing of requests of step S2505 may be optimized to promote regular usage of the social network, e.g. by selecting a time at which some or many users within the group of step S2500 are not active on the social network, thereby encouraging the users to open their instances of mobile app 170A and re-engage with use of the social network, or to share moments from their lives they wouldn't ordinarily think to share.

In step S2510, responses to the request of step S2505 are published. In some embodiments, only responses that qualify by meeting system-imposed editorial constraints (such as being submitted within a time-limited period following a system-initiated request, containing newly-captured photo or video content) are published, such as by adding the posts to a group chat or group story containing the group members selected in step S2500. In some embodiments, qualified posts and unqualified posts may be published, preferably with unqualified posts being rendered to viewers with a user interface indicium indicating the failure of the post to meet system-imposed editorial constraints, affixed either to unqualified posts indicating their unqualified status, or to qualified posts indicating their qualified status, or to both indicating their qualified or unqualified status.

Once a post is published in step S2510, the process may return to step S2505 for a further request to be periodically and automatically initiated by the social networking platform e.g. server 100. Users within the group of step S2500 may be permitted to opt out of the group e.g. via user interface mechanisms presented by mobile app 170A, and new users may similarly be added to the group.

One exemplary application in a direct messaging platform is within network-based tools or applications used for dating, i.e. an application in which individuals may be introduced to one another and provided with tools for communicating electronically, typically in advance of in-person interactions. Such applications may include dating-specific apps (such as Tinder®) or other social media apps having direct messaging functionality that may be used for dating purposes (such as Snapchat® or Instagram). One challenge commonly facing users of such systems is that participants may utilize old, outdated, heavily edited or carefully selected profile photos that do not accurately depict the participant's current state. Lack of candor in self-portrayal may prevent users from fairly evaluating interest and compatibility until an in-person date is arranged, with attendant monetary and time investment. Further, initial communications between newly-connected users in such platforms may sometimes be strained, awkward or lacking in authenticity, as the newly-matched users may lack shared history or experiences to serve as a foundation for communications. In some cases, a person may be shy and less comfortable initiating conversation with a stranger, or reluctant to ask the same exact question their match invariably has been asked many times before based on the few shared profile images, and would benefit by a system-provided mechanism for starting genuine conversations that both users enjoy based on unique subject matter, such as what the user is doing right at a specific moment.

In such circumstances, users may prefer to request photos spontaneously and using operational limitations described herein, in order to receive more candid and authentic insight into a matching user before investing time and money in an in-person date, as well as providing a shared experience as an "ice-breaker" and foundation for initial communications. In such embodiments, server 100 may be a network-connected server (or set of servers, as known in the art and understanding that server 100 as illustrated in FIG. 1 will be a simplified implementation relative to typical commercial-scale services) implementing user discovery and communication functionality common to dating apps, but further implementing externally-initiated content post requests using processes such as those of FIGS. 4A and 4B. Requestor 300 and target poster 310 may be users having been matched for communications. In order to monetize the application while also limiting usage to avoid user abuse, the Post Request step (e.g. step S400 or S420) may require payment of a fee by requestor 300.

In the context of a dating application, the intent of an externally-initiated content post may be directed more towards providing the post requestor 300 with insight into target poster 310 that is generally current (e.g. not several years old), rather than other social networking environments in which the objective may be to obtain near-real time feedback on a user's current status. Therefore, in such embodiments, time limits for response (e.g. in step S425) may be longer, such as 2 hours or 24 hours or 48 hours (or any amount of time between immediate and 48 hours or even one week), or no particular time limit may be imposed at all (although post requestor 300 may elect to discontinue interactions with target poster 310 if target poster 310 refuses to respond with a qualifying content post). In some embodiments, regardless of whether and what time limit is imposed, target poster 310 may be precluded from further communications via server 100 with post requestor 300 unless and until a qualifying content post is submitted by target poster 310 and published back to post requestor 300. In yet other embodiments, target poster 310 may be precluded from further communications via server 100 with post requestor 300 after expiration of a period of time following the externally-initiated content post request (e.g. communications between post requestor 300 and target poster 310 may be precluded if a qualifying content post is not provided prior to expiration of time in step S425).

While qualified posts as described herein may provide an effective mechanism for users of a dating app to have up-to-date, authentic images of other users with whom they have been matched, the context of a dating app match provides additional challenges. For example, matched users of a dating app may typically have little or no prior knowledge of, or information concerning, the users with whom they have been matched. Therefore, a user may feel hesitant to be the first to provide a candid, real-time image of themselves, which potentially includes the user's current location or environment, to another newly matched user.

Exacerbating such concerns, an increasing problem with current dating platforms is an influx of fake accounts set up for phishing or other inauthentic reasons. This is detrimental to users and dating app operators alike, leading users to waste time communicating with others based on grossly inauthentic representation. Users may be inclined to leave the app, and/or leave bad reviews after repeatedly wasting time interacting with dating matches who are not real. This problem with prevalent fake profiles may cause users to be skeptical of who they are communicating with, which may in turn lead users to be even more hesitant to respond to requests for authentic posts from other, newly-matched users.

Figure 26:
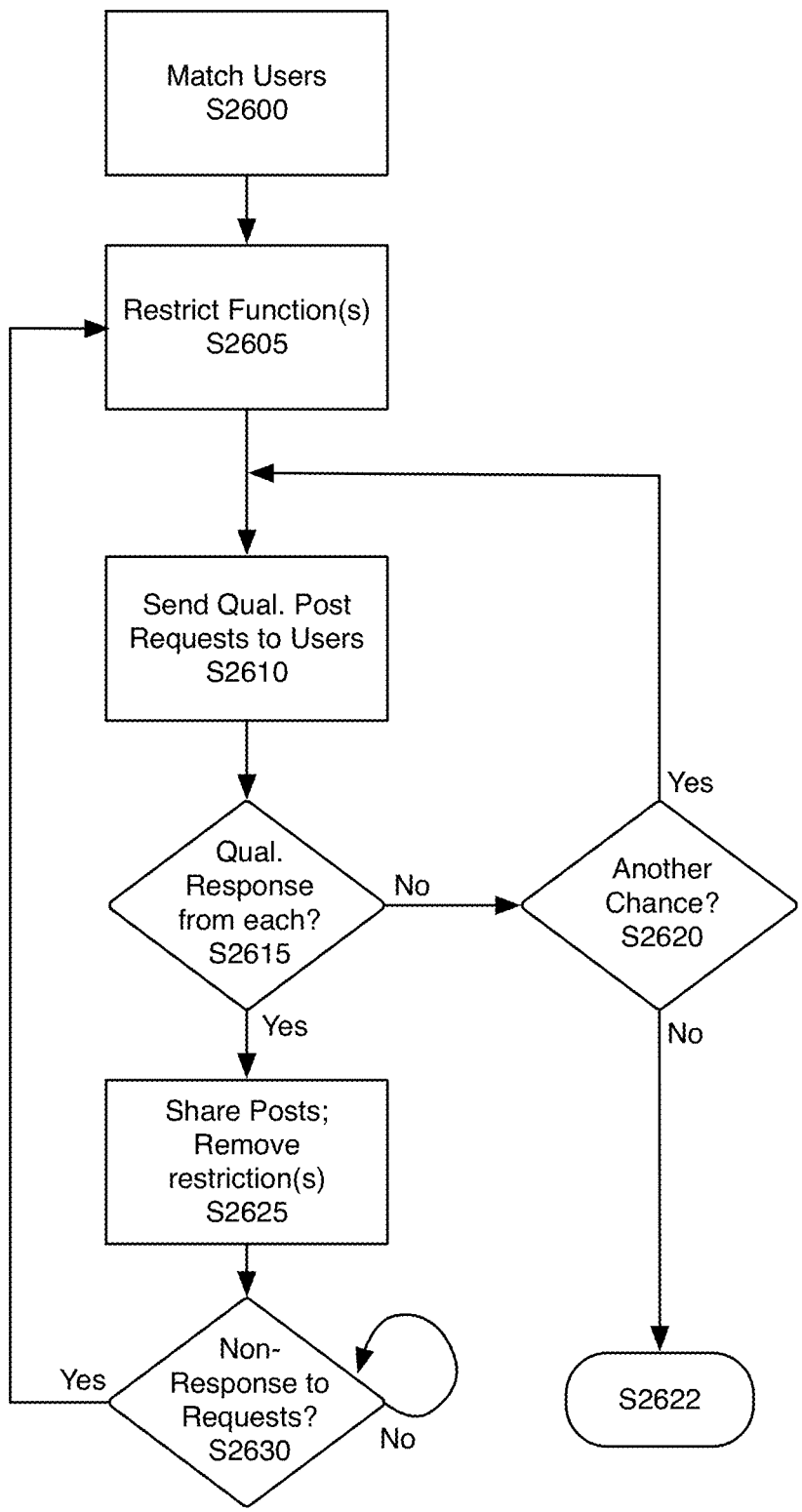
FIG. 26 is a flow chart of a process for implementing externally-triggered posts as a mechanism for improving authenticity of communications with untrusted third parties, such as within a dating application.

FIG. 26 illustrates an exemplary process, which may be particularly beneficial in embodiments encouraging exchange of qualified authentic posts amongst users who are newly-matched or who otherwise have not yet developed a trusted relationship, potentially by combining system-initiated requests with user-initiated requests. In step S2600, users are matched (or otherwise identified) for communication with one another via a social networking platform, such as a dating platform. The matching of users in step S2600 may be implemented automatically or algorithmically, such as via application of matching algorithms implemented by server 100 seeking to identify users that desire interaction with one another. Matching of users in step S2600 may alternatively or additionally involve user interactions with a social networking platform (e.g. presentation of profiles for acceptance or rejection by the user, or manual identification of users desired for matching), or some combination of algorithmic and user-controlled matching. For example, in some embodiments, a compatibility algorithm implemented by server 100 may initially select two users as candidates for matching, after which profiles associated with the two users may be presented to one another via mobile app 170A and smartphone 120C for initial user approval, with a match deemed to occur in step S2600 if each matched user approves of matching the other via interaction with mobile app 170A. In other embodiments, matching step S2600 may be entirely algorithmic, via software implemented on computer network 110, such as an algorithmic compatibility scoring based on user profile information meeting one or more predetermined matching criteria.

When two or more users are matched in step S2600, one or more platform functions may be initially restricted (step S2605). For example, in a dating application, matched users may be initially precluded from exchanging direct messages with one another. In other embodiments, matched users may be permitted to exchange messages in text form, but may be restricted from exchanging photo, video and/or audio communications. In yet other embodiments, restrictions may be placed on the time or frequency with which platform functionality may be used (e.g. matched users may exchange direct messages for a limited time period, such as 30 minutes, after matching, after which qualifying posts must be made by each user to continue communications; or matched users may exchange a limited number of direct messages (e.g. 10 messages), after which qualifying posts must be made by each user to continue communications; or matched users may exchange a limited number of messages per day, until they satisfy conditions e.g. in subsequent step S2615, or no such restriction may apply at all). In another example, users who matched by selecting each other may not be able to communicate at all until subsequently responding to authentic post requests (initiated by either the system or one or both matched users as defined elsewhere) with qualifying posts.

In step S2610, requests for qualifying posts may be sent to at least the matched users, similarly to requests described above e.g. in connection with FIG. 4A or FIG. 4B. In some embodiments, the qualifying post requests in step S2610 will be system-initiated post requests. In other embodiments, the post requests may be user-initiated post requests. In some embodiments, users may receive some combination of system-initiated and user-initiated post requests. But preferably, in each case, matched users will have received some qualifying post request that is initiated by a third party (i.e. not by the posting user), encouraging the posting user to submit candid, authentic and timely content.

In step S2615, a determination is made (e.g. by server 100) as to whether each of the users matched for communications in step S2600, has satisfied conditions for removal of restrictions imposed in step S2605. For example, in step S2615, a determination may be made as to whether both matched users responded to the requests in step S2610 with a qualifying post (e.g. time limited, location limited, or feature roadblock limited, such as further chat or the ability to see each other's qualified posts). The qualification conditions imposed in step S2615 may be the same as conditions for third-party initiated posts described in embodiments elsewhere herein, or different. For example, some systems may implement third party-initiated posts with a very short time period for submission of a qualifying response (e.g. within 2 minutes or 5 minutes of the time of request), in order to provide others with a near-real time view into a post author's life. However, the evaluation in step S2615 may be targeted to differing objectives. For example, for purposes of providing a user of a dating site with a relatively current depiction of the matched individual, it may be less important to have a photo be taken within 2 or 5 minutes of a request; a longer time period may still provide a matched user with a sufficiently authentic depiction to achieve desired purposes. Therefore, to the extent step S2615 evaluates for submission of a third-party initiated post within a particular time period of a post request, the time period evaluated in step S2615 may differ from time periods used by the platform for other evaluation purposes. For example, in a platform that deems third-party (system or other user) initiated posts generally to be timely if submitted within five minutes of a post request, the evaluation in step S2615 may be deemed to be satisfied if the matched users submit posts within 24 hours of a system-initiated or other-user-initiated post request (longer time limits such as 48 hours or longer may also be provided).

In yet other embodiments, the evaluation of step S2615 may not impose any time limit at all; rather, in such embodiments and in step S2615, the platform may determine that a matched user has submitted a qualifying post if the user has submitted a post containing a photo taken using e.g. camera 165 of smartphone 120C and mobile app 170A.

In some embodiments, time limitations imposed in step S2615 may be based on a reference other than a time of a third-party-initiated post request. For example, step S2615 may test to determine whether each of the matched users has submitted a post containing a photo taken using mobile app 170A, camera 165 and smartphone 120C, within a predetermined time period of the time of matching (e.g. after a date one week prior to the time of matching), or no time limit at all other than after the time of matching. Such an evaluation may still ensure that users have access to a relatively recent, authentic image depicting the other person, prior to initiating communications, and may serve to give recently matched users unique and personal photo and/or video content to chat about.

Other qualification criteria may additionally or alternatively be imposed in step S2615 in order to promote a baseline level of authenticity amongst matched users prior to initiating communications. For example, step S2615 may require posting of a photo and/or video captured using camera 165 under the control of mobile app 170A (or using both front and rear cameras) without application of filters or image retouching features.

In step S2625, qualifying posts identified in S2615 are shared with matched users and only then, restrictions imposed in step S2605 are removed. For example, in a dating application, two matched users may be initially precluded from direct messaging step S2605; they may subsequently receive system-initiated requests for qualifying posts in step S2610 (which may come some time period after matching, or immediately upon matching); and only after both users have submitted qualifying, authentic content posts (step S2615) are the qualifying posts shared with the other user and communication restrictions are removed (step S2625). As another example, in a dating application, a user may be initially precluded from sending user-initiated post requests to another user with whom they have been matched (step S2605); they may subsequently receive one or more system-initiated requests for qualifying posts in step S2610; and only after a user has submitted a qualifying post in response to a system-initiated request (step S2615) is that user enabled to send user-initiated post requests to others with whom they have been matched (step S2625). In some bases, both users may be required to submit qualifying posts prior to unlocking chat for the matched users.

While some embodiments of the process of FIG. 26 may be suitable to matching of two users for communications, it is contemplated that analogous process could be readily utilized for group communications amongst more than two users. For example, a group of users identified by server 100 as having common interests or other form of social compatibility may be matched in S2600, but only permitted to join a group communication (such as group chat) after having submitted a qualifying post in response to a third-party-initiated post request. In some such embodiments, functional restrictions imposed in step S2605 may be removed in steps S2615 and S2625 as to subsets of users who submit a qualifying content post in step S2615; for example, if twenty users are matched for communications within a group chat, users may be admitted to the group chat (i.e. in step S2625) as they post qualified content in response to third-party-initiated requests. In other embodiments, the restrictions imposed in step S2605 may be maintained until all matched users post qualified content in response to third-party-initiated requests.

To the extent one or more matched users have not submitted a qualified responsive content post in step S2615, a determination may be made as to whether such users will continue to have an opportunity to make a qualified responsive content post (step S2620). If so, such users may continue to receive additional requests for a qualified, third-party-initiated post (step S2610). If not, the process may be terminated (step S2622), in which case, for example, restrictions imposed in step S2605 may be maintained, or matched users may decide for themselves whether to engage in communications (such as direct messaging or responding to user-initiated post requests from the other user) realizing that the other user has failed to respond to requests for authentic posts. For example, a matched user may be provided with a period of time during which they must respond to at least one third-party-initiated post request. In other embodiments, matched users may be provided with a limited number of third-party-initiated requests to which a qualifying responsive post must be submitted; after which, a match may be broken or removed disabling communications with the matched user. For example, a matched user may be provided with three opportunities to submit a qualifying post in response to a system-initiated request, after which a match may be deemed broken disabling further communications with the matched individual.

To the extent a period of time is imposed in step S2620, the period may be substantially longer than a period of time after a third-party-initiated request during which a response will be deemed qualifying. For example, in some embodiments, even if any given post must be made within 5 minutes of a third-party post request to be a qualifying response, a user may be provided with a longer period (e.g. 24 hours or 48 hours) in step S2620 to qualify for removal of restrictions imposed in step S2605.

In some embodiments, even after users are matched, additional criteria may be imposed in order to maintain unrestricted communications amongst the users. For example, in step S2630, server 100 may periodically evaluate whether users matched in step S2600 maintain a threshold level of responsiveness to third-party-initiated post requests (whether system-initiated, other user-initiated, either, or both). If, e.g., users are deemed to become non-responsive to third-party-initiated posts (e.g. a user has not submitted a qualified content post in response to a third party request for an excessive period of time, or has failed to submit a qualified post in response to a threshold number of requests), the platform may deem such users as having questionable demonstrated authenticity, such that restrictions may be reimposed (step S2605) unless and until the user again provides qualifying, authentic content (steps S2610, S2615).

In some embodiments, a general purpose social networking platform, which may be implemented by server 100, may enable a variety of different types of content posts, including some posts that are qualified and generated in response to an external request (as described above), and other posts that may be traditional social network content posts that are not externally-triggered or qualified in accordance with criteria regarding generation of the post. In such environments, it may be desirable to provide content viewers with a visual indication as to which posts were externally-triggered and qualified by the rules of the system (and thereby are presumably more authentic), and which posts contain content determined by the poster without constraints. In some embodiments, a badge, icon, watermark or other indicium may be superimposed on or rendered proximate a posting in order to indicate to a viewer that the posting was externally triggered and qualified, and thus differentiating the posting for the viewer from other types of content postings (i.e. non-qualifying content posts, such that content posts that are not externally or third party-initiated, not submitted during a qualifying time period, lacking content required for qualification, not generated using a qualifying user device, or the like). For example, FIG. 18B illustrates a content posting view 1801 in which badge 1802 (comprising MRN as an abbreviation for Me Right Now) is overlaid on posting image 1804 to indicate to a viewer that image 1804 is an externally-triggered posting. In other embodiments, qualified and externally-triggered posts may be segregated within a social media application with other qualified, externally-triggered posts, such as within a specific gallery. In some embodiments, externally-triggered posts may be published in an ephemeral gallery; in others, externally-triggered posts may be published in a non-ephemeral gallery. Without such explicit designation in a social network that allows for multiple types of posts (including some that are not externally-initiated or otherwise qualified as authentic as described herein), the special authentic value of qualified posts derived from system-imposed constraints may be lost on recipients. Such loss of understanding by a viewing user may be important to a post author, as it may present reputation risk for sharing content of an unusually candid nature relative to conventional posts. In this way, such indication of qualifying constraints that were imposed by the system makes sharing of such authentic content safe where it otherwise may be deemed too risky.

Figure 19:

In some embodiments, it may be desirable to provide incentive mechanisms for users to consistently respond to external post requests with qualified content postings. This may be necessary to make the system perform predictably enough for users to participate in kind with their own responsive posts. FIG. 19 illustrates such a mechanism, implemented by display 1900. Display 1900 includes a listing of other users 1902 (preferably, users having a predetermined or qualifying social network connection with the viewer to whom display 1900 is rendered). Each other user listing within listing 1902 includes a total number 1904 of qualified, externally-triggered content posts that have been submitted, and a STREAK indicium 1906 comprising the number of consecutive external post requests to which the user has provided a qualified posting in response, or the number of consecutive days a user has made at least one such qualifying post. Presenting such statistics or other reward indicia to users may inspire users desiring to present an authentic view of their lives via the social networking service to quickly and consistently respond to external post requests. In other embodiments, users may be shown a response rate for themselves and their friends, indicating what percentage of requests a user has responded to, either historically or for a recent period of time, such as the last 30 days. Such response statistics may further incentivize users to respond to requests, and in cases where users may be limited to the number of requests they can send, encourage users to choose target recipients who are more likely to answer their requests.

Figure 20:
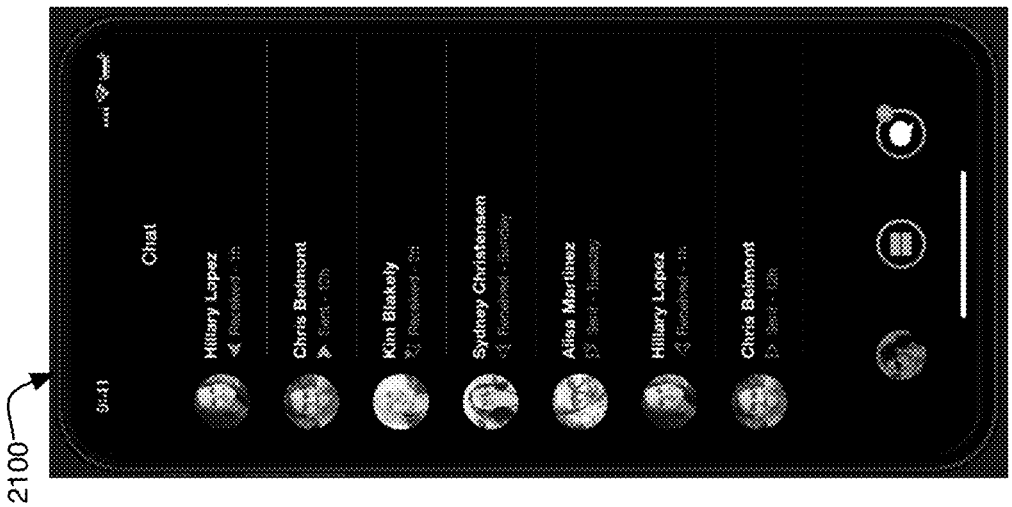
Figure 21:
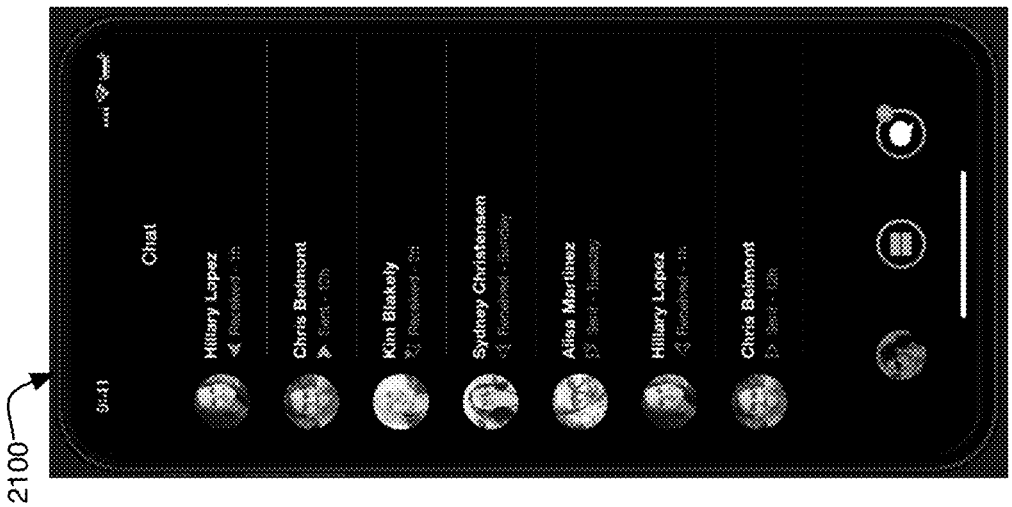

In some embodiments, other social network content and features may also be implemented in systems providing for externally-triggered posts. For example, FIG. 20 illustrates an activity feed display 2000, providing a viewer with a summary of information related to external content requests. FIG. 21 illustrates implementation of a chat mechanism, whereby users may interact with displays such as display 2100 to exchange one-to-one or group messaging within the platform in response to qualifying posts they or friends have made, or independent of such posts.

Some users may wish to opt out of receiving externally-initiated post request during certain periods of time, which may be recurring (e.g. no post requests between 11 pm and 9 am) or ad hoc (e.g. permitting a user to temporarily disable receipt of post requests for a selected period of time, or permitting a user to turn on and turn off receipt of system-initiated or other user-initiated post requests at will). Such configurations may be provided via interaction with user interface settings presented by e.g. mobile app 170A, and are preferably transmitted back to server 100 for implementation across all user applications. In some embodiments enabling users to initiate requests for other users, the initiating user may be provided with a user interface notification indicating that another user is presently unavailable to receive third party-initiated requests.

While certain embodiments of the invention have been described herein in detail for purposes of clarity and understanding, the foregoing description and Figures merely explain and illustrate the present invention and the present invention is not limited thereto. It will be appreciated that those skilled in the art, having the present disclosure before them, will be able to make modifications and variations to that disclosed herein without departing from the scope of the invention or appended claims.

The invention claimed is:

1. A method for a social networking platform to solicit candid content from a post author to share among one or more other users, comprising:
  executing instructions on one or more network-connected processing devices that, when executed by the one or more processing devices, cause the one or more processing devices to perform the following operations:
  selecting, by the social networking platform, one or more users from amongst a plurality of users of the social networking platform for receipt of a request to submit a qualified post of a qualified post type upon which one or more editorial constraints are specified and imposed by the platform;
  requesting, at times determined by the social networking platform, that each of the selected one or more users author and submit a qualified post of the qualified post type;
  in connection with the step of requesting, precluding access by the one or more users to one or more functions of the social networking platform;
  sharing, via said social networking platform having performed the step of selecting one or more users, a qualified post with at least one of the one or more users of the social networking platform other than a user having authored the qualified post; and enabling access to the one or more functions for the user having authored the qualified post, after one or more conditions are satisfied;

wherein the one or more conditions for enabling access to the one or more functions for a user comprise the user having submitted a qualified post to the social networking platform; and wherein said one or more editorial constraints imposed upon the qualified post type comprise: that the qualified post must include photo and/or video content newly captured by the user having authored the qualified post subsequent to the step of requesting, via operation of a social networking application implementing the social networking platform on said user's network-connected computing device.

2. The method of claim 1, wherein the times determined by the social networking platform for requesting that the selected one or more users submit a qualified post of the qualified post type are determined on a per-user basis.

3. The method of claim 1, wherein the times determined by the social networking platform for requesting that the selected one or more users submit a qualified post of the qualified post type are contemporaneous.

4. The method of claim 1, wherein the step of requesting comprises, for each of the one or more users: transmitting a notification from the social networking platform to a device associated with the user.

5. The method of claim 1, wherein the step of requesting comprises, for each of the one or more users: displaying a notification within or outside of the social networking application by a device associated with the user.

6. The method of claim 1, in which the step of selecting one or more users comprises selecting a group of two or more users of the social networking platform for contemporaneous receipt of a system-initiated request for a qualified post; and the step of requesting that each of the selected one or more users submit a qualified post comprises contemporaneously delivering user-facing notifications to the one or more users.

7. The method of claim 6, further comprising:
receiving, in response to the requesting step, one or more qualified posts from amongst the selected one or more users; and
publishing said one or more qualified posts to a viewing group comprising at least one of the selected one or more users.

8. The method of claim 7, in which the step of publishing said one or more qualified posts to the viewing group only occurs, for each user within the viewing group, after the user within the viewing group has submitted a qualified post in response to said requesting step.

9. The method of claim 1, in which the step of requesting, at times determined by the social networking platform, that each of the selected one or more users author and submit a qualified post of the qualified post type comprises:
determining the times for requesting based at least in part upon geographic locations of the one or more users.

10. The method of claim 1, wherein the step of selecting, by the social networking platform, one or more users from amongst a plurality of users of the social networking platform for receipt of a request to submit a qualified post comprises:
determining the times for requesting prior to selecting the one or more users; and
subsequently selecting the one or more users from amongst a plurality of users of the social networking platform for receipt of a request, based at least in part upon each user's likelihood of posting at the determined time.

11. The method of claim 1, wherein the step of selecting, by the social networking platform, one or more users from amongst a plurality of users of the social networking platform for receipt of a request to submit a qualified post comprises:
selecting the one or more users based on one or more factors comprising: the frequency with which users interact with one another via the social networking platform.

12. The method of claim 1, wherein the step of selecting, by the social networking platform, one or more users from amongst a plurality of users of the social networking platform for receipt of a request to submit a qualified post comprises:
selecting the one or more users based on one or more factors comprising: the recency with which users have communicated with one another via the social networking platform.

13. The method of claim 1, wherein the step of selecting, by the social networking platform, one or more users from amongst a plurality of users of the social networking platform for receipt of a request to submit a qualified post comprises:
selecting the one or more users based on one or more factors comprising: information within user profiles maintained by the social networking platform and associated with each of the one or more users.

14. The method of claim 1, wherein the step of selecting, by the social networking platform, one or more users from amongst a plurality of users of the social networking platform for receipt of a request to submit a qualified post comprises:
selecting the one or more users based on one or more factors comprising: a time period since each user's last receipt of a request for a qualified post.

15. The method of claim 1, wherein the step of selecting, by the social networking platform, one or more users from amongst a plurality of users of the social networking platform for receipt of a request to submit a qualified post comprises:
selecting the one or more users based on one or more factors comprising: the users having matched for communications within the social networking platform.

16. The method of claim 15, wherein the step of requesting is performed contemporaneously with the users having been matched for communications within the social networking platform.

17. The method of claim 1, wherein the step of precluding access by the one or more users to one or more functions of the social networking platform comprises precluding access to viewing qualified posts of the one or more other users.

18. The method of claim 1, wherein the step of precluding access by the one or more users to one or more functions of the social networking platform comprises precluding access to direct messaging with the one or more other users having been selected by the social networking platform for receipt of a request to submit a qualified post of a qualified post type.

19. The method of claim 1, further comprising: publishing qualified posts received from the one or more users in response to the requesting step, to each of the one or more users, only after each of the one or more users has submitted a qualified post in response to the requesting step.

20. The method of claim 1, wherein the step of selecting one or more users for receipt of a request comprises implementing, by a network-connected social networking platform server, a machine learning algorithm for identification of said one or more users from amongst a plurality of users of the social networking platform.

21. The method of claim 1, wherein the step of requesting, at times determined by the social networking platform, that each of the selected one or more users author and submit a qualified post of the qualified post type, comprises: implementing, by a network-connected social networking platform server, a machine learning algorithm for selection of said times.

22. The method of claim 1, wherein said one or more editorial constraints imposed upon the qualified post type comprise: that the qualified post must include photo and/or video content newly captured by a post author within a limited time period from the time of request.

23. The method of claim 22, wherein the limited time period from the time of request is a duration not exceeding one day.

24. The method of claim 22, wherein the limited time period from the time of request is a duration not exceeding two days.

25. The method of claim 22, wherein the limited time period from the time of request is a duration not exceeding one week.

26. The method of claim 1, wherein said one or more editorial constraints imposed upon the qualified post type comprise: that the qualified post must include photo and/or video content newly captured by a post author using a front camera of a mobile computing device subsequent to the step of requesting.

27. The method of claim 26, wherein said one or more editorial constraints imposed upon the qualified post type further comprise: that the qualified post must include photo and/or video content newly captured by a post author using a back camera of a mobile computing device subsequent to the step of requesting.

28. The method of claim 1, wherein the step of sharing comprises:
displaying the qualified posts in a manner that indicates the qualified posts have met said one or more editorial constraints for authenticity.

29. The method of claim 28, in which the step of displaying the qualified posts in a manner that indicates the qualified posts have met said one or more editorial constraints for authenticity comprises displaying the qualified posts in a feed consisting of qualified posts.

30. The method of claim 1, wherein the step of selecting, by the social networking platform, one or more users from amongst a plurality of users of the social networking platform for receipt of a request to submit a qualified post comprises:
selecting the one or more users based on one or more factors comprising: the users having a predetermined social networking connection within the social networking platform.

* * * * *